US012638024B2

(12) United States Patent
Heeter et al.

(10) Patent No.: US 12,638,024 B2
(45) Date of Patent: May 26, 2026

(54) FAN CASING OR LINER WITH INTERCHANGEABLE TIP TREATMENT SEGMENTS

(71) Applicant: Rolls-Royce North American Technologies Inc., Indianapolis, IN (US)

(72) Inventors: Robert W. Heeter, Indianapolis, IN (US); Daniel E. Molnar, Jr., Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/951,582

(22) Filed: Nov. 18, 2024

(65) Prior Publication Data

US 2026/0139689 A1 May 21, 2026

(51) Int. Cl.

| | |
|---|---|
| ***F04D 29/52*** | (2006.01) |
| ***F04D 29/32*** | (2006.01) |
| *F01D 5/14* | (2006.01) |
| *F01D 11/08* | (2006.01) |
| *F04D 29/68* | (2006.01) |

(52) U.S. Cl.

CPC ........... *F04D 29/526* (2013.01); *F04D 29/32* (2013.01); *F01D 5/145* (2013.01); *F01D 11/08* (2013.01); *F04D 29/681* (2013.01); *F04D 29/685* (2013.01); *F05D 2240/11* (2013.01)

(58) Field of Classification Search

CPC .... F04D 29/526; F04D 29/522; F04D 29/685; F04D 29/681; F01D 11/08; F01D 5/145

See application file for complete search history.

(56) References Cited

U.S. PATENT DOCUMENTS 891,569 A 6/1908 See
4,086,022 A 4/1978 Freeman et al.
4,097,188 A * 6/1978 Forster .................... F01D 9/047 415/202
4,239,452 A * 12/1980 Roberts, Jr. ............. F01D 11/12 415/173.5
5,308,225 A * 5/1994 Koff ........................ F01D 11/08 415/58.7
5,474,417 A * 12/1995 Privett ................ F04D 27/0207 415/58.7
5,586,859 A * 12/1996 Nolcheff ............... F04D 29/685 415/173.1
5,607,284 A * 3/1997 Byrne ................... F04D 29/526 415/58.7

(Continued)

*Primary Examiner* — Courtney D Heinle
*Assistant Examiner* — Behnoush Haghighian
(74) *Attorney, Agent, or Firm* — Barnes & Thornburg

(57) ABSTRACT

A fan case assembly includes an annular case including a first circumferentially-extending slot formed therein, and a tip treatment segment arranged within the first slot and retained therein. The tip treatment segment includes a radially inwardly-facing segment surface having a tip treatment groove formed therein. The tip treatment segment is selectively removable from and insertable into the first slot and is slidable within and along the first slot such that the tip treatment segment is configured to be selectively positioned within the first slot so as to alter the portion of a flow path across the annular case in order to control stall margin of the gas turbine engine and optimize performance of the gas turbine engine.

18 Claims, 20 Drawing Sheets

(56) References Cited

U.S. PATENT DOCUMENTS 6,350,102 B1 * 2/2002 Bailey .................... F01D 11/02 415/173.5
6,409,470 B2 * 6/2002 Allford ................ F04D 29/685 415/58.7
6,648,591 B2 * 11/2003 Collins ................ F01D 25/246 415/58.7
6,648,593 B2 * 11/2003 Motherwell .......... F04D 29/164 415/119
6,685,426 B2 * 2/2004 Clark .................... F04D 29/526 415/119
6,719,527 B2 * 4/2004 Collins ................ F04D 29/685 415/173.1
6,832,890 B2 12/2004 Booth
6,905,305 B2 6/2005 James
7,210,905 B2 * 5/2007 Lapworth ............ F04D 29/685 415/220
7,645,121 B2 * 1/2010 Tudor .................. F04D 29/685 415/220
7,766,614 B2 * 8/2010 Northfield ............ F04D 29/685 415/196
8,100,629 B2 * 1/2012 Lebret .................... F01D 25/24 415/58.7
8,152,445 B2 * 4/2012 Guemmer ................ F01D 9/04 415/58.7
8,257,022 B2 9/2012 Guemmer
8,337,146 B2 * 12/2012 Yu ........................ F04D 29/685 415/173.1
8,419,355 B2 4/2013 Guemmer et al.
8,550,768 B2 * 10/2013 Montgomery ........ F04D 29/685 415/57.1
8,777,558 B2 7/2014 Brunet et al.
8,845,269 B2 9/2014 Agneray et al.
9,004,859 B2 4/2015 Shahpar et al.
9,115,594 B2 * 8/2015 Krautheim ............ F04D 29/685
9,574,455 B2 * 2/2017 McCaffrey ............. F01D 25/12
9,587,509 B2 * 3/2017 Guemmer ............ F04D 29/681
9,638,213 B2 5/2017 Obrecht et al.
9,664,204 B2 * 5/2017 Guemmer ............ F04D 29/161
9,957,976 B2 * 5/2018 Allford ................ F04D 29/685
10,006,467 B2 * 6/2018 Guemmer ............ F04D 29/541
10,047,620 B2 * 8/2018 Giacché ................ F04D 29/685
10,066,640 B2 * 9/2018 Bennington .......... F04D 29/321
10,082,152 B2 * 9/2018 Zhang .................. F04D 29/541
10,107,307 B2 * 10/2018 Urac .................... F04D 29/685
10,151,206 B2 * 12/2018 Zotz ...................... F04D 29/644
10,309,243 B2 * 6/2019 McCaffrey ................ F01D 9/02
10,323,534 B2 * 6/2019 McCaffrey ............ F01D 11/127
10,648,484 B2 * 5/2020 Gentry ...................... F01D 5/20
10,914,318 B2 * 2/2021 Capozzi ................ F04D 29/526
11,078,805 B2 * 8/2021 Joly ...................... F04D 29/526
11,098,731 B2 * 8/2021 Gentry ...................... F01D 5/20
11,131,322 B2 9/2021 Grothe et al.
11,346,367 B2 * 5/2022 Yu ........................ F04D 29/681
11,473,438 B2 * 10/2022 Reynolds .............. F04D 29/526
12,071,959 B1 * 8/2024 Duong .................. F04D 29/526
12,247,494 B2 * 3/2025 Perez ...................... F04D 19/00
2002/0000086 A1 * 1/2002 Allford ............... F04D 27/0207 60/805
2002/0122719 A1 * 9/2002 Clark .................... F04D 29/685 415/119
2002/0122726 A1 * 9/2002 Collins ................ F04D 29/164 416/194
2005/0111968 A1 * 5/2005 Lapworth ........... F04D 27/0207 415/182.1
2007/0160459 A1 * 7/2007 Tudor .................. F04D 29/526 415/119
2007/0212217 A1 * 9/2007 Northfield ............ F04D 29/526 415/200
2010/0310353 A1 * 12/2010 Yu ........................ F04D 29/685 415/220
2011/0299979 A1 * 12/2011 Montgomery ........ F04D 29/526 415/182.1
2012/0163967 A1 * 6/2012 Krautheim ............ F04D 29/526 29/889.22
2012/0315131 A1 * 12/2012 Mertens .............. F04D 27/0215 415/126
2014/0017072 A1 * 1/2014 McCAFFREY ........ F01D 11/24 415/173.1
2014/0119883 A1 * 5/2014 Kempf .................. F04D 29/164 415/110
2014/0356144 A1 * 12/2014 Guemmer ............ F04D 29/685 415/174.1
2015/0003976 A1 * 1/2015 Zotz ...................... F04D 29/563 415/208.1
2015/0086344 A1 * 3/2015 Guemmer ............ F04D 29/526 415/174.1
2015/0104298 A1 * 4/2015 Allford ................ F04D 29/685 415/173.1
2015/0337672 A1 * 11/2015 McCaffrey ............. F01D 25/24 415/173.1
2016/0169017 A1 * 6/2016 Giacché ................ F04D 29/526 415/168.1
2016/0230776 A1 * 8/2016 Bennington .......... F04D 29/685
2016/0305285 A1 * 10/2016 Urac .................... F04D 29/685
2017/0089352 A1 * 3/2017 Zhang .................. F01D 25/246
2017/0122120 A1 * 5/2017 McCaffrey ............ F01D 11/127
2018/0231023 A1 * 8/2018 Gentry ...................... F01D 5/20
2020/0182259 A1 * 6/2020 Gentry .................. F04D 29/321
2020/0224675 A1 * 7/2020 Capozzi ................ F04D 29/685
2020/0325790 A1 * 10/2020 Joly ...................... F04D 29/685
2020/0386111 A1 * 12/2020 Reynolds .................. F01D 9/04
2021/0033108 A1 * 2/2021 Yu ........................ F04D 29/681
2024/0200468 A1 * 6/2024 Perez ...................... F01D 9/041

* cited by examiner

FAN CASING OR LINER WITH INTERCHANGEABLE TIP TREATMENT SEGMENTS

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to fan track liners for gas turbine engines.

BACKGROUND

Gas turbine engines used in aircraft often include a fan assembly that is driven by a shaft core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from liberating from the fan assembly in case of a blade-off event in which a fan blade is released from the fan rotor.

Fan cases sometimes include metallic shrouds and liners positioned between the metallic shroud and the fan blades. Liners are generally used to achieve a desired dimensional tolerance between the fan blades and the fan case as well as provide a zone of frangible material for the fan blades to traverse during a fan blade-off event and subsequent fan rotor orbiting such that damage to the fan rotor is limited. The distance between the fan blades and the liners may affect stall margin and overall engine efficiency. This may be the case particularly when the engine is experiencing inlet distortion due to embedded installation.

SUMMARY

The present disclosure may comprise one or more of the following features and combinations thereof.

According to a first aspect of the present disclosure, a fan case assembly adapted for use with a gas turbine engine includes an annular case that extends at least partway circumferentially around an axis of a gas turbine engine, the annular case including a radially outwardly-facing surface and a radially inwardly-facing surface opposite the radially outwardly-facing surface, the annular case further including a first slot formed in the radially inwardly-facing surface and extending circumferentially at least partway around the axis, and at least one tip treatment segment arranged within the first slot and retained therein, the at least one tip treatment segment including a radially inwardly-facing segment surface having at least one tip treatment groove formed therein, the radially inwardly-facing segment surface defining a portion of a flow path across the annular case.

In some embodiments, the at least one tip treatment segment is selectively removable from and insertable into the first slot and is slidable within and along the first slot such that the at least one tip treatment segment is configured to be selectively positioned within the first slot so as to alter the portion of the flow path across the annular case in order to control stall margin of the gas turbine engine and optimize performance of the gas turbine engine.

In some embodiments, the at least one tip treatment segment includes a first tip treatment segment and a second tip treatment segment, and the first and second tip treatment segments are arranged within the first slot at different circumferential positions.

In some embodiments, a circumferentially-facing surface of the first tip treatment segment contacts a circumferentially-facing surface of the second tip treatment segment such that the first and second tip treatment segments are arranged circumferentially adjacent to each other.

In some embodiments, the at least one tip treatment groove of the first tip treatment segment is identical to the at least one tip treatment groove of the second tip treatment segment.

In some embodiments, the first tip treatment segment is circumferentially spaced apart from the second tip treatment segment.

In some embodiments, the fan case assembly further includes at least one smooth wall segment arranged within the first slot and circumferentially between and contacting each of the first and second tip treatment segments.

In some embodiments, the at least one smooth wall segment includes a radially inwardly-facing smooth wall surface that includes a constant, uninterrupted curvature in the circumferential direction.

In some embodiments, the radially inwardly-facing smooth wall surface, the radially inwardly-facing segment surfaces of the first and second tip treatment segments, and the radially inwardly-facing surface of the annular case are flush with each other so as to define a smooth surface across which the flow path extends but for the at least one grooves formed in the first and second tip treatment segments.

In some embodiments, the fan case assembly further includes at least one smooth wall segment arranged within the first slot. The at least one tip treatment segment can include a plurality of tip treatment segments arranged within the first slot at different circumferential positions. At least one of (i) the at least one smooth wall segment is arranged circumferentially between and contacting two tip treatment segments of the at plurality of tip treatment segments so as to circumferentially space apart the two tip treatment segments, or (ii) the plurality of tip treatment segments includes a first group of two or more tip treatment segments and a second group of two or more tip treatment segments circumferentially spaced apart from the first group of two or more tip treatment segments. The at least one smooth wall segment can be arranged circumferentially between and contacting the first and second groups of two or more tip treatment segments so as to circumferentially space apart the first and second groups of two or more tip treatment segments.

In some embodiments, the annular case further includes a second slot formed in the radially inwardly-facing surface and extending circumferentially at least partway around the axis, the second slot being axially spaced apart from the first slot, and the second slot includes one or more tip treatment segments of the at least one tip treatment segment arranged therein.

In some embodiments, the at least one tip treatment segment includes a protrusion and the first slot includes a recess formed in an inner surface of the first slot, and the protrusion includes a portion arranged radially outwardly of and that overhangs and rests on a corresponding radially outwardly-facing portion of the recess such that the recess retains the at least one tip treatment segment within the first slot.

In some embodiments, the recess of the first slot extends circumferentially along a circumferential extent of the first slot and is formed to have a dovetail shape, and the protrusion of the at least one tip treatment segment extends circumferentially along a circumferential extent of the at least one tip treatment segment and includes a dovetail shape that corresponds with the dovetail shape of the recess of the first slot.

In some embodiments, the annular case is segmented to define an annular case segment, a plurality of annular case segments including the annular case segment are arranged circumferentially adjacent to each other so as to form a full hoop annular ring, and the at least one tip treatment segment is configured to be removed from and inserted into the first slot via a circumferential opening of the first slot located at a circumferential end of the annular case segment.

According to a further aspect of the present disclosure, a fan case assembly adapted for use with a gas turbine engine includes an annular case or a fan case liner that extends at least partway circumferentially around an axis of a gas turbine engine and including a first slot formed therein and extending circumferentially at least partway around the axis and opening radially inwardly, and a first tip treatment segment arranged within the first slot and retained therein, the first tip treatment segment including a radially inwardly-facing segment surface having a first tip treatment feature formed on the radially inwardly-facing segment surface.

In some embodiments, the first tip treatment segment is selectively removable from and insertable into the first slot at unique circumferential positions within the first slot such that the first tip treatment segment is configured to be selectively positioned within the first slot.

In some embodiments, the first tip treatment feature formed on the radially inwardly-facing segment surface is a groove formed in the radially inwardly-facing segment surface and opening radially inwardly.

In some embodiments, the fan case assembly further includes a second tip treatment segment arranged within the first slot and retained therein, the second tip treatment segment including a second tip treatment feature formed as a groove on a radially inwardly-facing segment surface of the second tip treatment. The first and second tip treatment segments can be arranged within the first slot at different circumferential positions In some embodiments, the fan case assembly further includes at least one smooth wall segment arranged within the first slot and circumferentially between each of the first and second tip treatment segments.

In some embodiments, the annular case or fan track liner further includes a second slot formed therein and extending circumferentially at least partway around the axis and opening radially inwardly, and the second slot includes a third tip treatment segment arranged therein.

In some embodiments, the groove of the first tip treatment feature of the third tip treatment segment includes a different shape than the grooves of the first and second tip treatment features of the first and second tip treatment segments.

According to a further aspect of the present disclosure, a method includes providing an annular case that extends at least partway circumferentially around an axis of a gas turbine engine, the annular case including a radially outwardly-facing surface and a radially inwardly-facing surface opposite the radially outwardly-facing surface, and forming a first slot in the radially inwardly-facing surface of the annular case, the first slot extending circumferentially at least partway around the axis.

The method can further include forming at least one tip treatment groove in a radially inwardly-facing segment surface of the at least one tip treatment segment, the radially inwardly-facing segment surface defining a portion of a flow path across the annular case, the at least one tip treatment segment being selectively removable from and insertable into the first slot and is slidable within and along the first slot, arranging the at least one tip treatment segment within the first slot and retaining the at least one tip treatment segment therein, and selectively positioning the at least one tip treatment segment within the first slot so as to alter the portion of the flow path across the annular case in order to control stall margin of the gas turbine engine and optimize performance of the gas turbine engine.

These and other features of the present disclosure will become more apparent from the following description of the illustrative embodiments.

DETAILED DESCRIPTION OF THE DRAWINGS

Figure 1:
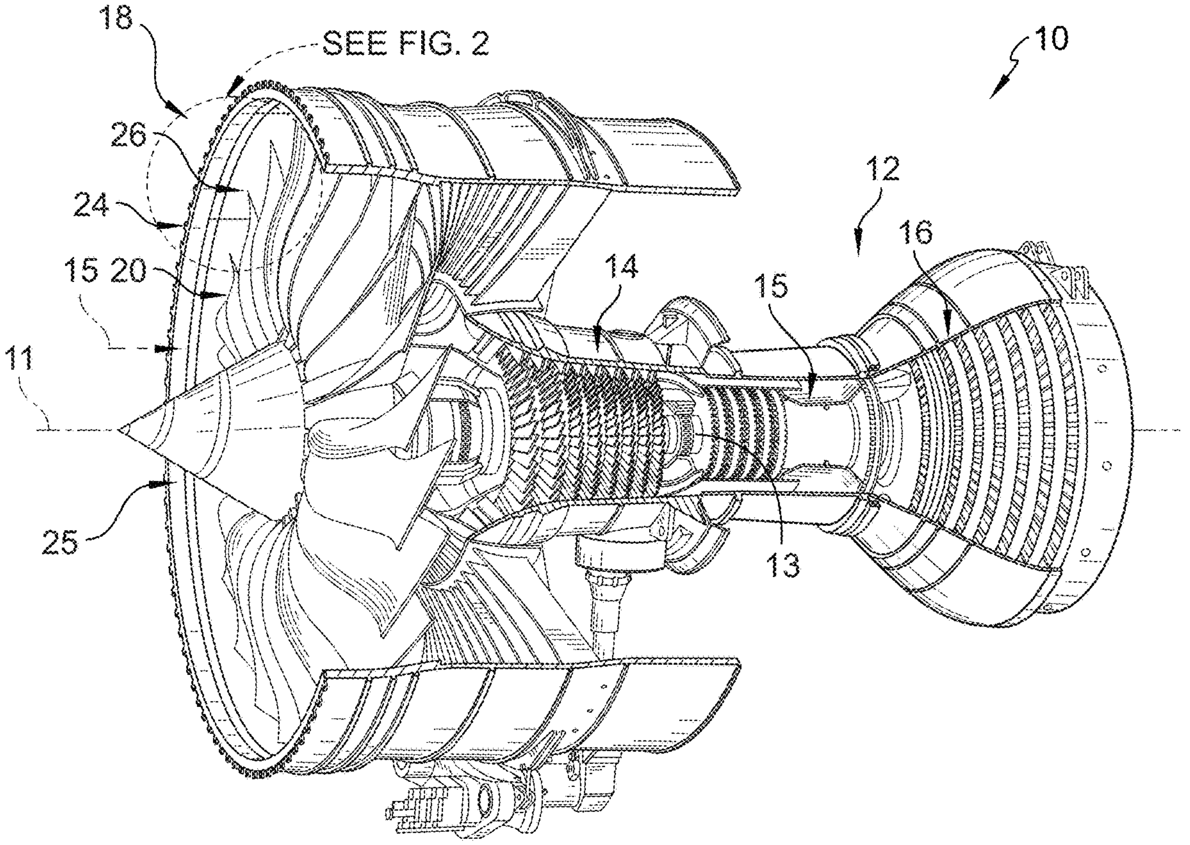
FIG. 1 is a cutaway view of a gas turbine engine that includes a fan, a compressor, a combustor, and a turbine, the fan including a fan rotor with fan blades configured to rotate about an axis of the engine and a fan case assembly that surrounds the fan blades and showing that the fan case assembly includes an annular case and a fan track liner coupled to the annular case.

For the purposes of promoting an understanding of the principles of the disclosure, reference will now be made to a number of illustrative embodiments illustrated in the drawings and specific language will be used to describe the same.

Figure 10:
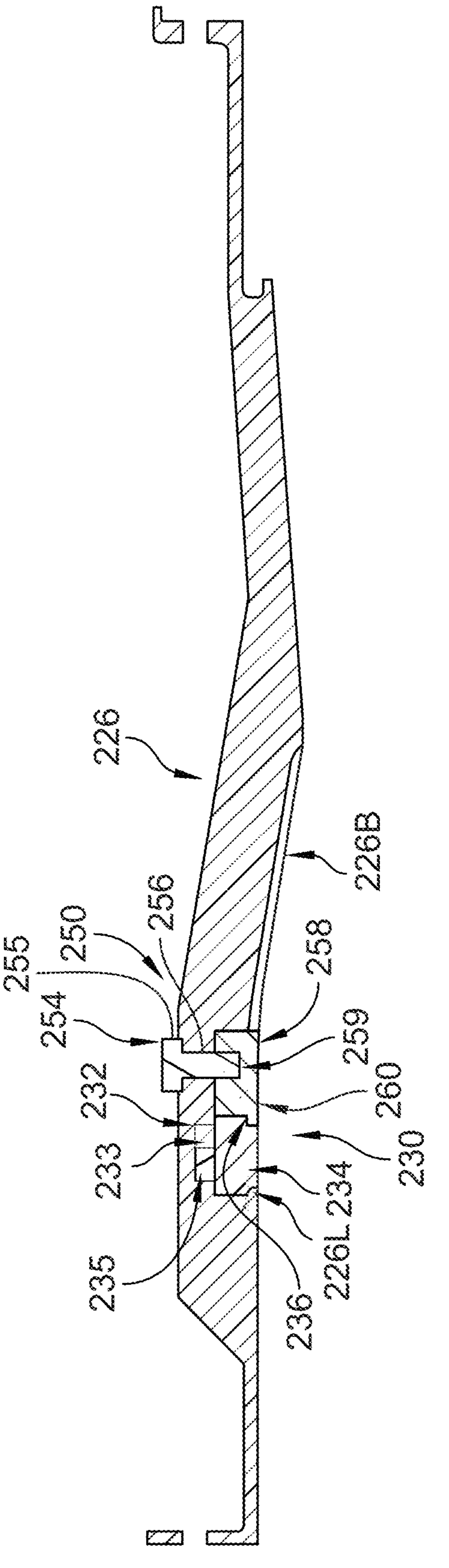
FIG. 10 is a side cross-sectional view of a fan case assembly according to a further aspect of the present disclosure, showing that the assembly can include an annular case formed to include a slot and a tip treatment segment retained in the slot via an radial retention assembly included a retaining block and a retaining rod extending through the annular case and retaining the retaining block within the slot, the retaining block including at least one flange configured to retain the tip treatment segment in the slot.
Figure 11:
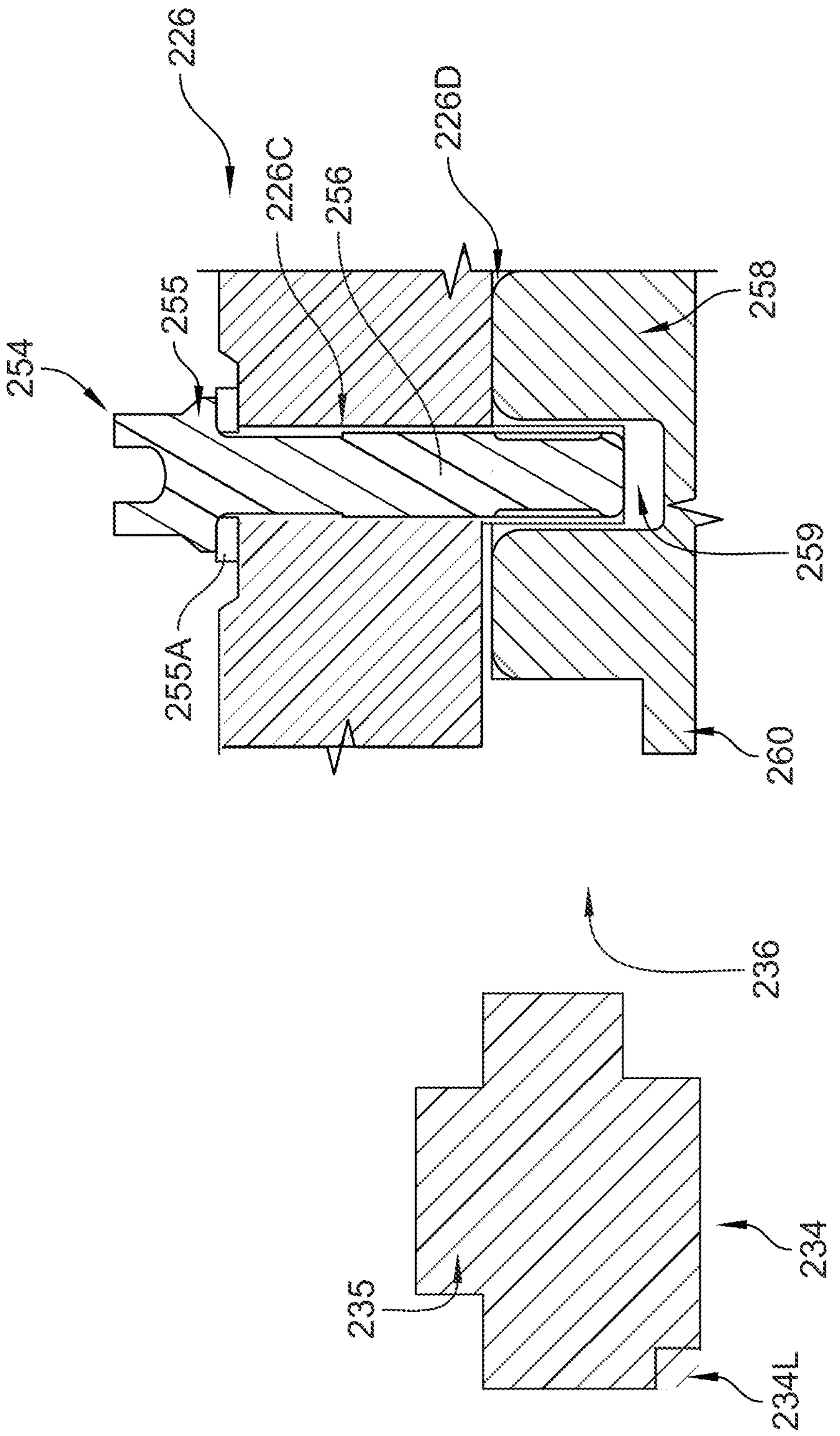
FIG. 11 is magnified view of the components of the fan case assembly of FIG. 10, showing the tip treatment segment removed from the retaining block.
Figure 12:
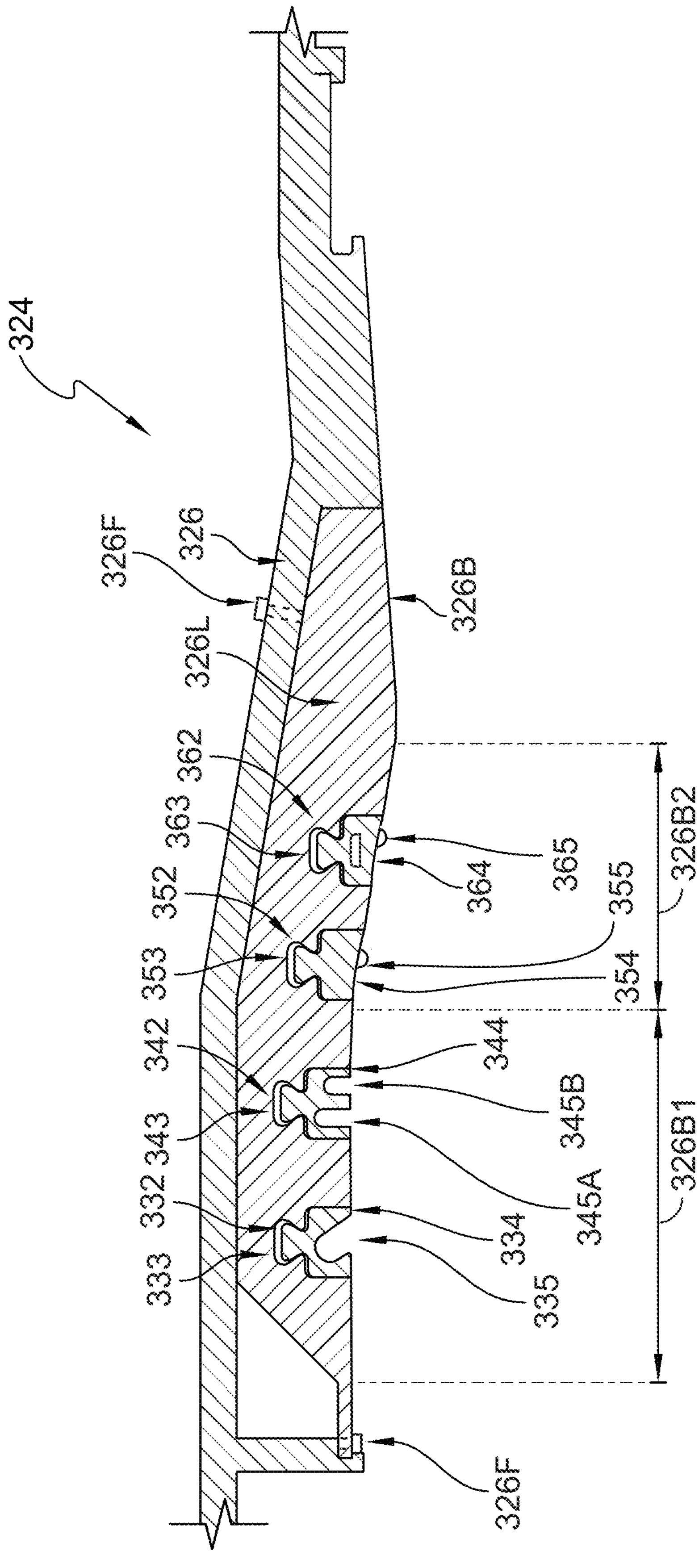
FIG. 12 is a side cross-sectional view of a fan case assembly according to a further aspect of the present disclosure, showing that the assembly can include an annular case and a fan track liner coupled to the annular case and formed to include a plurality of circumferentially extending slots in a radially inwardly-facing surface of the fan track liner, and showing that each slot can include at least one tip treatment segment arranged therein that affects the flow of air over the surfaces of the surfaces of the segments and the fan track liner.

A fan case assembly 24 according to a first aspect of the present disclosure is shown in FIGS. 2-7, which includes a case 26, slots 32, 42, 52, 62 formed in a radially inwardly facing surface 26B of the case 26, and a plurality of tip treatment segments 34, 44, 54, 64 selectively positioned within the slots 32, 42, 52, 62 so as to alter the portion of the flow path 15 across the annular case 26 in order to control stall margin of the gas turbine engine 10 and optimize performance of the gas turbine engine 10. A fan case assembly 124 according to a further aspect of the present disclosure is shown in FIGS. 8-9D, which includes tip treatment segments 134, 144 having a longer axially extent than those shown in FIGS. 2-7 such that the segments 134, 144 are each retained by two recesses 133A, 133B formed in the slot 132. A fan case assembly 224 according to a further aspect of the present disclosure is shown in FIGS. 10 and 11, which includes a slot 232 and a tip treatment segment 234 retained in the slot 232 via a radial retention assembly 250. A fan case assembly 224 according to a further aspect of the present disclosure is shown in FIG. 12, which includes an annular case 326 and a fan track liner 326L in which the slots 332, 342, 352, 362 that retain the plurality of tip treatment segments 334, 344, 354, 364 are formed.

A gas turbine engine 10 in accordance with the present disclosure is shown in FIG. 1 and includes an engine core 12 and a fan 18 arranged upstream of the engine core 12. The engine core 12 is configured to compress and combust air entering the gas turbine engine 10 to drive rotation of one or more shafts 13 about a rotation axis 11 of the gas turbine engine 10. The one or more shafts 13 interconnect the engine core 12 and the fan 18 to cause rotation of the fan 18 and to provide thrust for the gas turbine engine 10.

The engine core 12 includes a compressor 14, a combustor 15, and a turbine 16. The compressor 14 includes one or more stages of rotating blades that compress air entering the engine core 12 and produce pressurized air which is transferred downstream to the combustor 15. The combustor is configured to mix fuel with the pressurized air and combust the fuel and pressurized air to produce combustion products which are transferred downstream to the turbine 16. The turbine 16 also includes one or more stages of rotating blades which are coupled to the one or more shafts 13 and are driven in rotation about the axis 11. Rotation of the one or more shafts 13 causes rotating components of the fan 18 to rotate about the axis 11.

The fan 18 includes a fan case assembly 24 extending circumferentially about the axis 11 and a plurality of rotating blades 20 spaced radially inward of the fan case assembly 24, as shown in FIG. 1. The fan case assembly 24 provides an outer boundary of a flow path 15 into the gas turbine engine 10 and lines the plurality of rotating blades 20. The plurality of rotating blades 20 extend from a hub that is coupled to at least one of the one or more shafts 13 for rotation therewith about the axis 11.

Figure 2:
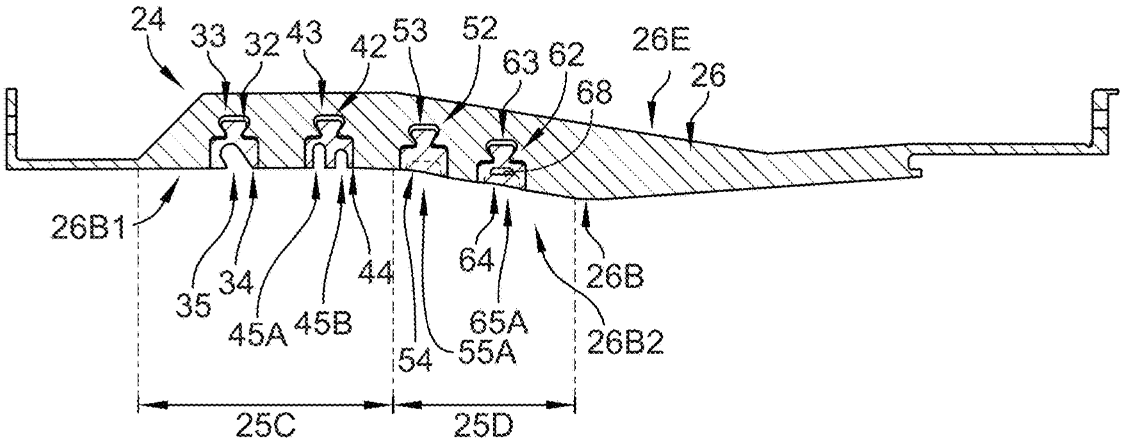
FIG. 2 is a side cross-sectional view of the fan case assembly of FIG. 1, showing that the assembly can include an annular case, which may be a split case, formed to include a plurality of circumferentially extending slots in a radially inwardly-facing surface of the annular case, and showing that each slot can include at least one tip treatment segment arranged therein that affects the flow of air over the surfaces of the surfaces of the segments and the annular case.
Figure 3:
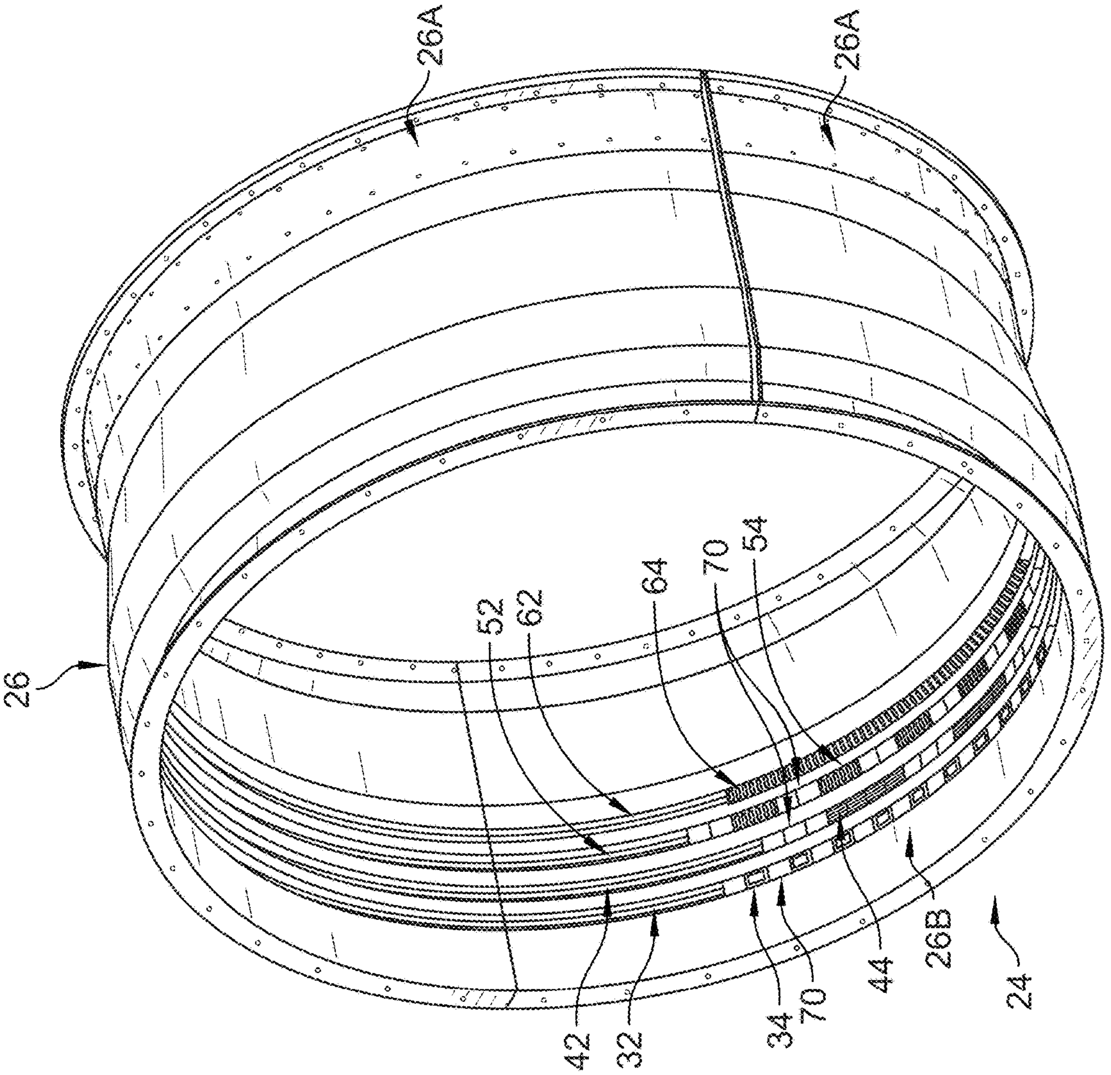
FIG. 3 is a perspective view of the annular case of the fan case assembly of FIG. 2, showing that the annular case can be split to form a full hoop ring and includes a plurality of circumferentially extending slots and a plurality of tip treatment segments arranged in each slot with smooth wall segments arranged between some of the tip treatment segments.

The fan case assembly 24 is fixed relative to the plurality of blades 20 and illustratively includes an annular case 26, as shown in FIG. 2. The annular case 26 extends circumferentially about the axis 11 of the gas turbine engine 10, and can be formed as a full annular hoop, as shown in FIG. 1, or in split, segmented sections, as shown in FIG. 3. Exemplary advantages of utilizing a full annular hoop annular case 26 may apply to the embodiment described below with regard to FIGS. 10 and 11, while exemplary advantages of utilizing a split annular case 26 comprised of case segments 26A may apply to the embodiments described below with regard to FIGS. 2-9 and 12.

In some embodiments, as shown in FIG. 12 and described in greater detail below, an alternative fan case assembly 324 can further include a fan track liner 326L that includes the components and features of the fan case assembly 24 of FIGS. 2-7, which includes components and features formed and arranged in the annular case 26, instead formed and arranged in the fan track liner 326L. The distance between the plurality of blades 20 and the annular case 26 or the fan track liner 326L may affect stall margin and overall engine efficiency, which may be particularly apparent when the engine 10 is experiencing embedded inlet distortion.

The annular case 26 includes a radially outwardly-facing surface 26E and a radially inwardly-facing surface 26B opposite the outwardly-facing surface 26E. In some embodiments, as shown in FIG. 3, the split annular case 26 can be formed of multiple case segments 26A which each include a radially inwardly-facing surface 26B that defines a portion of the flow path 15 through the fan case assembly 24. In some embodiments, the split annular case 26 can be formed of two case segments 26A, each formed as half of a full annular ring, as shown in FIG. 3.

As can be seen more clearly in FIG. 2, the radially inwardly-facing surface 26B of the annular case 26 can include a first portion 26B1 extending generally axially and a second portion 26B2 axially aft of the first portion 26B1 and being angled radially inward so as to form a radially inward slope (also referred to as a hade angle). A person skilled in the art will understand that, although the illustrated radially inwardly-facing surface 26B of the annular case 26 includes this general contour, a fully axially extending radially inwardly-facing surface 26B, a fully radially inwardly sloped radially inwardly-facing surface 26B, or other combinations of slopes, including radially outward, may also be utilized.

As described above, the distance between the fan blades 20 and the radially inwardly-facing surface 26B of the annular case 26 may affect stall margin and overall engine 10 efficiency, in particular when the engine 10 is experiencing inlet distortion due to embedded application. In order to control this distance and thus the flow of air (flow path 15) across the radially inwardly-facing surface 26B of the annular case 26 so as to control stall margin and air flow behavior, tip treatment features arranged on the radially inwardly-facing surface 26B of the annular case 26 may be implemented according to the present disclosure.

Specifically, a plurality of slots 32, 42, 52, 62 can be formed in the annular case 26 and can each include at least one tip treatment segment 34, 44, 54, 64 arranged in and retained by the respective slot 32, 42, 52, 62, the tip treatment segments 34, 44, 54, 64 each including tip treatment features 35, 45, 55, 65 configured to affect the air flow over the radially inwardly-facing surface 26B so as to control stall margin and air flow behavior in specific areas of the annular case 26. As shown in the exemplary embodiment in FIG. 3, the annular case 26 can include four slots 32, 42, 52, 62 that each extend circumferentially at least partway circumferentially around the axis 11. In embodiments in which the annular case 26 is split into case segments 26A, each slot 32, 42, 52, 62 may extend from one circumferential end of the segment 26A to the other circumferential end of the segment 26A, as shown in FIG. 3. This allows for the treatment segments 34, 44, 54, 64 to be inserted into the open circumferential ends of the slots 32, 42, 52, 62 during installation. In embodiments in which the annular case 26 is fully annular, the slots 32, 42, 52, 62 extend entirely and uninterruptedly around the annular case 26.

Illustratively, the annular case 26 can include four slots 32, 42, 52, 62 axially spaced apart from each other, with two slots 32, 42 being formed in the first portion 26B1 extending generally axially and two slots 52, 62 being formed in the second portion 26B2 that is angled radially inward. As shown in FIG. 2, the four slots 32, 42, 52, 62 are equally spaced apart axially, which may advantageously provide for more equal control over the stall margin and air flow behavior along the axial extent of the annular case 26. A person skilled in the art will understand that some slots 32, 42, 52, 62 may be formed more or less close to other slots 32, 42, 52, 62 based on the areas requiring more or less air flow manipulation. Moreover, more or fewer than four slots 32, 42, 52, 62 may be included along the axial extent of the radially inwardly-facing surface 26B of the annular case 26, again, based on the areas requiring more or less air flow manipulation.

Figure 4:
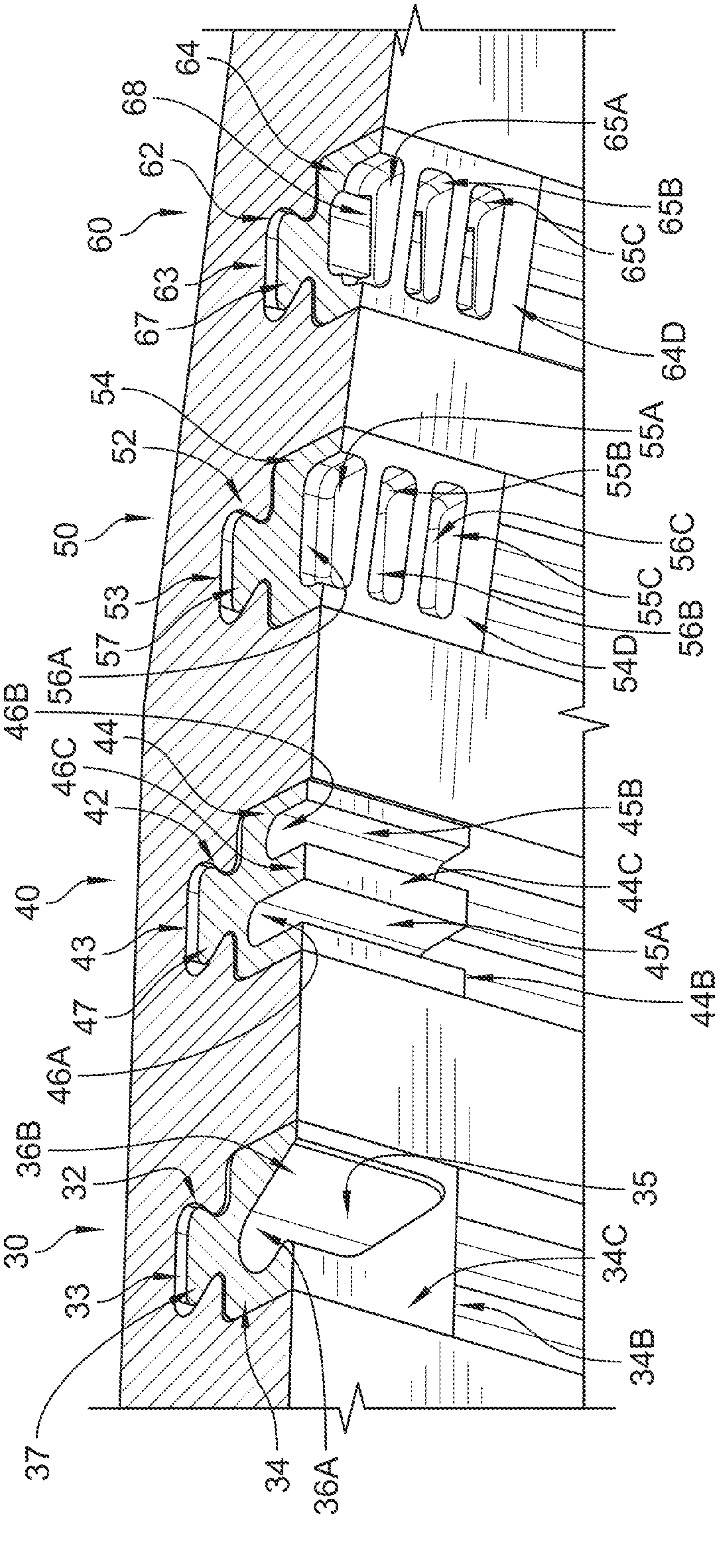
FIG. 4 is a magnified perspective view of exemplary tip treatment segments used in the slots of the fan case assembly of FIG. 2.
Figure 7:
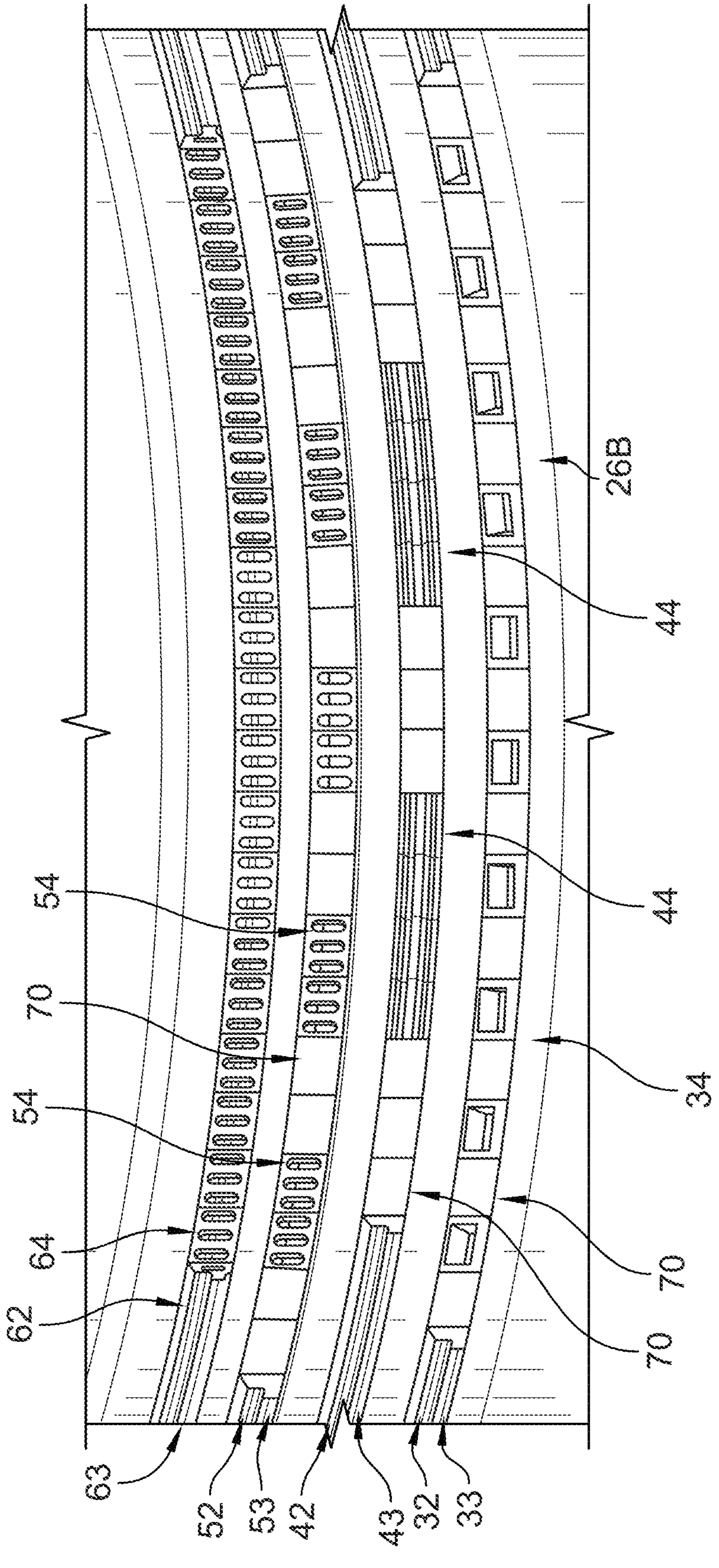
FIG. 7 is a radially outwardly-facing view of the fan case assembly of FIG. 3, showing various configurations of tip treatment segments and smooth wall segments in the slots.
Figure 8:
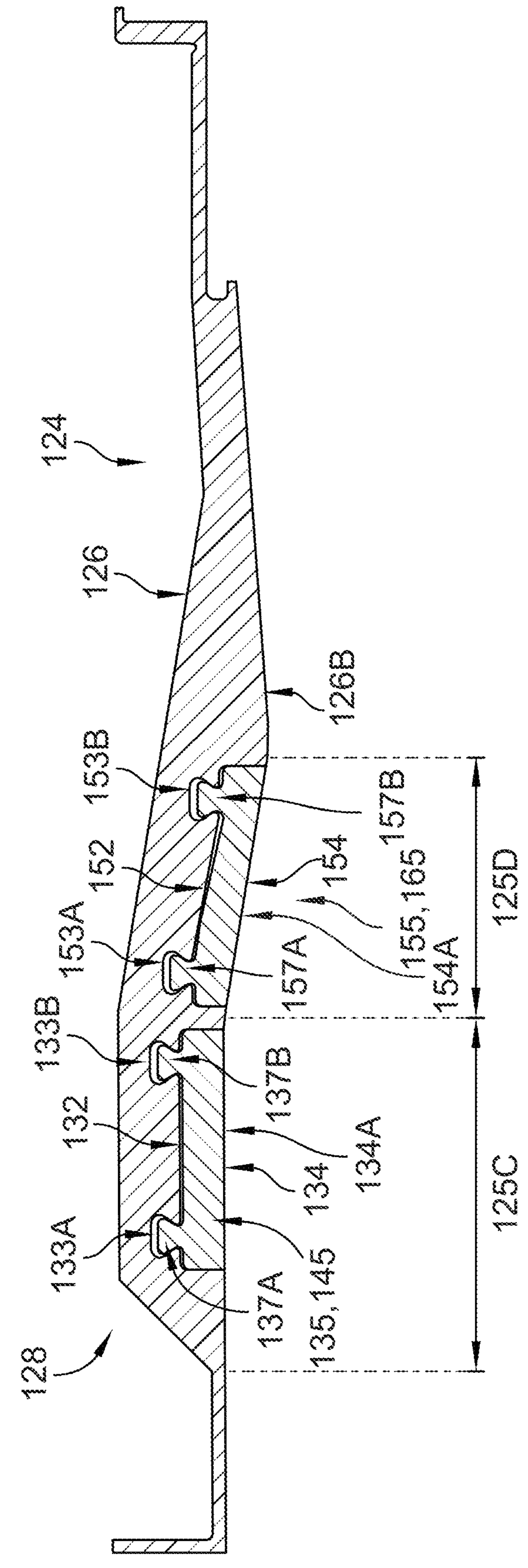
FIG. 8 is a side cross-sectional view of a fan case assembly according to a further aspect of the present disclosure, showing that the assembly can include an annular case formed to include a plurality of circumferentially extending slots in a radially inwardly-facing surface of the annular case, and showing that tip treatment segments can be arranged in the slots, the tip treatment segments having a longer axial width than the tip treatment segments shown in FIG. 2 such that each tip treatment segment is arranged in and retained by two recesses formed in each slot.

As can be seen in greater detail in FIGS. 4 and 7, each slot 32, 42, 52, 62 includes a slot retaining feature 33, 43, 53, 63 that extends circumferentially along the circumferential extent of the slot and is formed to be capable of retaining a corresponding segment retaining feature 37, 47, 57, 67 of a respective tip treatment segment 34, 44, 54, 64 therein. The segment retaining feature 37, 47, 57, 67 of the tip treatment segment 34, 44, 54, 64 may extend along the circumferential extent of the segment 34, 44, 54, 64. Illustratively, the slot retaining feature 33, 43, 53, 63 is formed to be capable of retaining a respective tip treatment segment 34, 44, 54, 64 within the slot without the use of additional fasteners or retaining means, thus facilitating easy insertion and removal of the segments 34, 44, 54, 64 in the slots 32, 42, 52, 62. In other embodiments, the segments 34, 44, 54, 64 may be retained in the slots 32, 42, 52, 62 may be retained via fastening means in addition to or alternatively to the fastener-less fashion described herein.

Figure 5A:
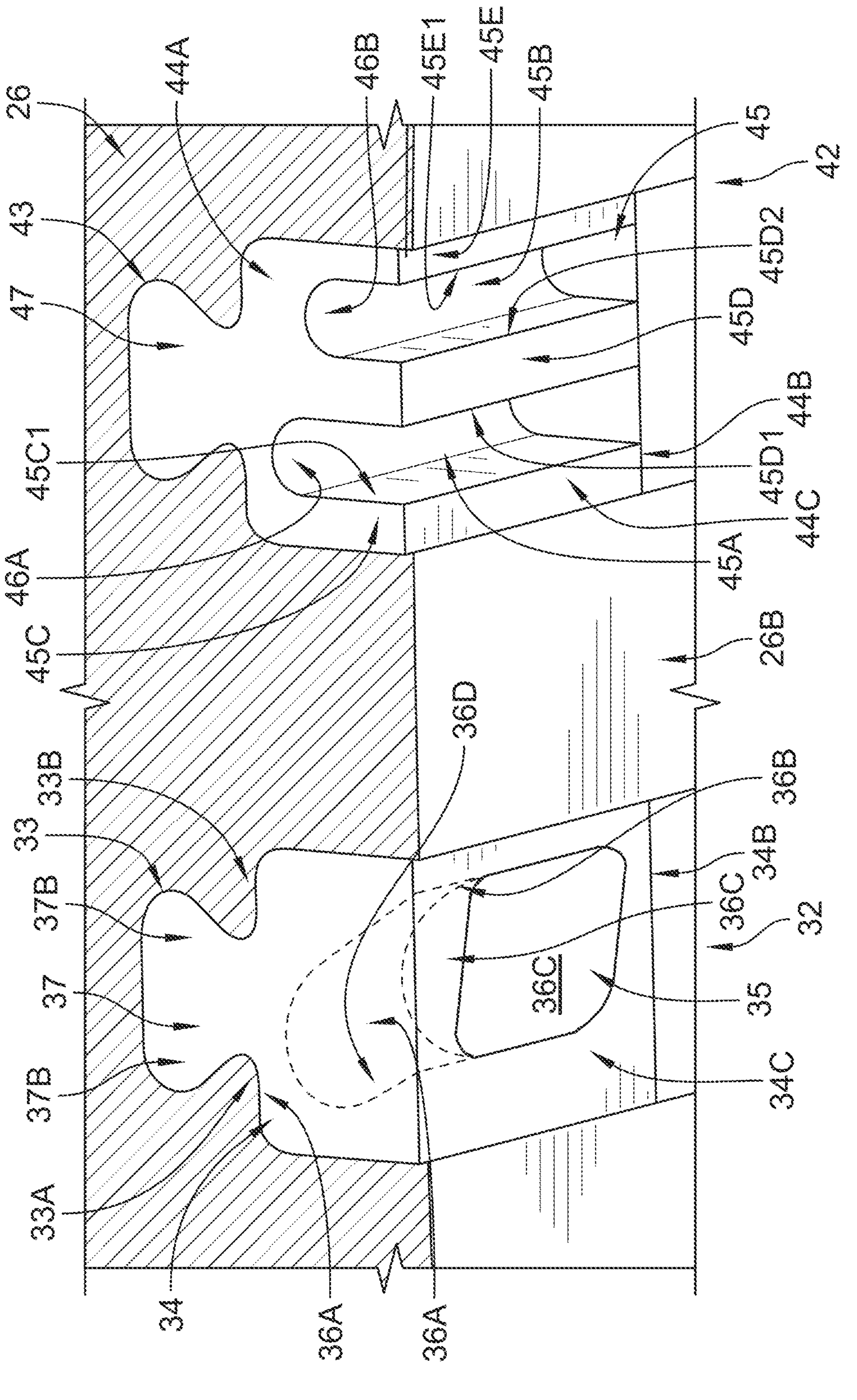
FIG. 5A is a magnified perspective view of two exemplary tip treatment segments of the tip treatment segments of FIG. 4, showing that one of the exemplary tip treatment segments can include a forward-leaning groove and one of the exemplary tip treatment segments can include two parallel circumferentially extending grooves having differing depths.

By way of example, as shown in FIG. 5A, one or more of the tip treatment segments 34, 44, 54, 64 can include a protrusion and the respective slot 32, 42, 52, 62 can include a recess 33, 43, 53, 63 formed in an inner surface (e.g. FIG. 5A, inner, bottom surface 32A of the slot 32) of the slot 32, 42, 52, 62. It is noted that, although the following exemplary description of the retaining features is with reference to the first tip treatment segment 34 shown in FIG. 5A, the features apply to and can be included in the segment retaining features 47, 57, 67 of the other tip treatment segments 44, 54, 64 and the slot retaining features 43, 53, 63 of the other slots 42, 52, 62. By way of a non-limiting example, as shown in FIG. 5A, The dovetail shaped protrusion 37 of the first tip treatment segment 34 itself may be considered a protrusion, or the individual protrusions 37A, 37B on opposing sides of the dovetail shaped protrusion 37 may each be considered a protrusion. In some embodiments, the protrusion (e.g. FIG. 5A, dovetail shaped protrusion 37) of the segment retaining feature 37 can include a portion or portions (i.e. portion 37A of the dovetail shape or portion 37B of the dovetail shape) that are arranged radially outwardly of and overhang and rest on a corresponding radially outwardly-facing portion 33A, 33B of the recess 33 such that the recess 33 retains the tip treatment segment 34 within the slot 32 without the use of additional fasteners or retaining means.

A person skilled in the art will understand that fastener-less retaining means provides an easy means of inserting and removing the tip treatment segments 34, 44, 54, 64 to and from the slots 32, 42, 52, 62. An advantageous shape that allows for easy inserting and removing of the tip treatment segments 34, 44, 54, 64 may include a dovetail shape, as shown in FIGS. 2-9. The dovetail shape, or any shape or configuration of the segment retaining means 37, 47, 57, 67 may extend along a circumferential extent of the segment 34, 44, 54, 64, and is formed to correspond to an inverse of the shape or contour of the slot retaining means 33, 43, 53, 63 (i.e. dovetail-shaped recesses 33, 43, 53, 63 shown in FIGS. 2-9). Although a dovetail shape is shown, other advantageous shapes are contemplated by the present disclosure so long as the shape is configured to retain the tip treatment segment 34, 44, 54, 64 within the slot 32, 42, 52, 62 without the use of additional fasteners or retaining means.

The tip treatment segments 34, 44, 54, 64 may be formed to include any circumferential length and any shape of tip treatment feature 35, 45, 55, 65 in the radially inwardly-facing surface 34C, 44C, 54C, 64C that will be optimal for controlling stall margin and air flow behavior across the segments 34, 44, 54, 64 and the radially inwardly-facing surface 26B of the annular case 26 for the particular areas around the circumference of the annular case 26 at which the segments 34, 44, 54, 64 are positioned. It may be advantageous in some embodiments, in particular when conducted early testing in order to assess air flow behaviors and characteristics, to provide small tip treatment segments 34, 44, 54, 64 around the circumference of the annular case 26, as shown in FIGS. 3 and 7. The smaller tip treatment segments 34, 44, 54, 64 may allow for more precise modifications to be made during the testing and analysis process (i.e. switching in and out of small tip treatment segments 34, 44, 54, 64 in order to change the flow behavior in exact locations on the annular case 26).

By way of a non-limiting example, as shown in FIGS. 3 and 7, each tip treatment segment 34, 44, 54, 64 can be formed as a small block including a circumferential extent that is a small fraction of the entire circumferential length of the annular case 26. For example, the circumferential extent of the tip treatment segments 34, 44, 54, 64 may be 1⁄100 or smaller of the entire circumferential length of the annular case 26. In some embodiments, the circumferential extent of the tip treatment segments 34, 44, 54, 64 may be between 1⁄100 and 1⁄50 of the entire circumferential length of the annular case 26. In some embodiments, the circumferential extent of the tip treatment segments 34, 44, 54, 64 may be between 1⁄50 and 1⁄30 of the entire circumferential length of the annular case 26. In some embodiments, the circumferential extent of the tip treatment segments 34, 44, 54, 64 may be between 1⁄30 and 1⁄20 of the entire circumferential length of the annular case 26. In some embodiments, the circumferential extent of the tip treatment segments 34, 44, 54, 64 may be between 1⁄20 and 1⁄10 of the entire circumferential length of the annular case 26. In some embodiments, the circumferential extent of the tip treatment segments 34, 44, 54, 64 may be between 1⁄10 and 1⁄5 of the entire circumferential length of the annular case 26. In some embodiments, the circumferential extent of the tip treatment segments 34, 44, 54, 64 may be between 1⁄5 and 1⁄2 of the entire circumferential length of the annular case 26. In some embodiments, the circumferential extent of the tip treatment segments 34, 44, 54, 64 may be extend around the entire circumferential length of the annular case 26. As will be described below, the smooth wall segments 70 arranged within the slots 32, 42, 52, 62 and adjacent to the tip treatment segments 34, 44, 54, 64 may be formed to have the same or different circumferential extents as the tip treatment segments 34, 44, 54, 64.

FIG. 4, as well as FIGS. 5A-5H in greater detail, show exemplary shapes of the tip treatment features 35, 45, 55, 65 formed the tip treatment segments 34, 44, 54, 64. The shapes illustrated in these figures as well as the remainder of the disclosure, although providing advantageous properties for controlling stall margin and air flow behavior across the segments 34, 44, 54, 64 and the radially inwardly-facing surface 26B of the annular case 26, are merely exemplary, and other shapes and features may be formed in the segments 34, 44, 54, 64 in order to effect flow behavior changes.

The tip treatment features 35, 45, 55, 65 are formed on a radially inwardly-facing surface 34C, 44C, 54C, 64C of the tip treatment segment 34, 44, 54, 64. In some embodiments, the radially inwardly-facing surfaces 34C, 44C, 54C, 64C of the tip treatment segments 34, 44, 54, 64 are formed to be flush with the portions of the radially inwardly-facing surface 26B adjacent to the slots 32, 42, 52, 62 in which the segments 34, 44, 54, 64 are arranged. This can be seen in FIGS. 2, 4-6, 8, 10, and 12, in which the radially inwardly-facing surfaces 34C, 44C, 54C, 64C of the tip treatment segments 34, 44, 54, 64, the first portion 26B1 of the radially-inwardly facing surface 26B, and the second portion 26B2 of the radially-inwardly facing surface 26B form a continuous surface that is flush along its axially extent across which the flow path 15 passes.

As shown in FIGS. 4, 5A, 5D, and 5E, a first tip treatment segment 34, also referred to as a first tip treatment segment 34, is arranged in the forwardmost first slot 32 and includes a first circumferential side 34A, a second opposing circumferential side 34B, and a dovetail shape protrusion 37 or segment retaining feature 37. The segment 34 may include a single tip treatment feature 35 formed as a forward-leaning groove 35 in the radially-inwardly facing surface 34C. In some embodiments, the forward-leaning groove 35 may be located generally centrally along the circumferential extent of the segment 34 and slightly offset axially aft of the segment 34, as shown in FIG. 5A.

The groove 35 may include a bottom inner surface 36A that is curved ("bottom" referring to the bottom of the groove, i.e. radially outward side), an aft inner surface 36B that is angled axially forward, opposing circumferential inner surfaces 36C, and a forward inner surface 36D that is also angled axially forward. As can be seen in FIG. 5D, the opposing circumferential inner surfaces 36C, also referred to as side walls, of the groove 35 can each be angled in the same circumferential direction relative to the circumferential sides 34A, 34B. In some embodiments, the opposing circumferential inner surfaces 36C are parallel with each other.

Figure 5B:
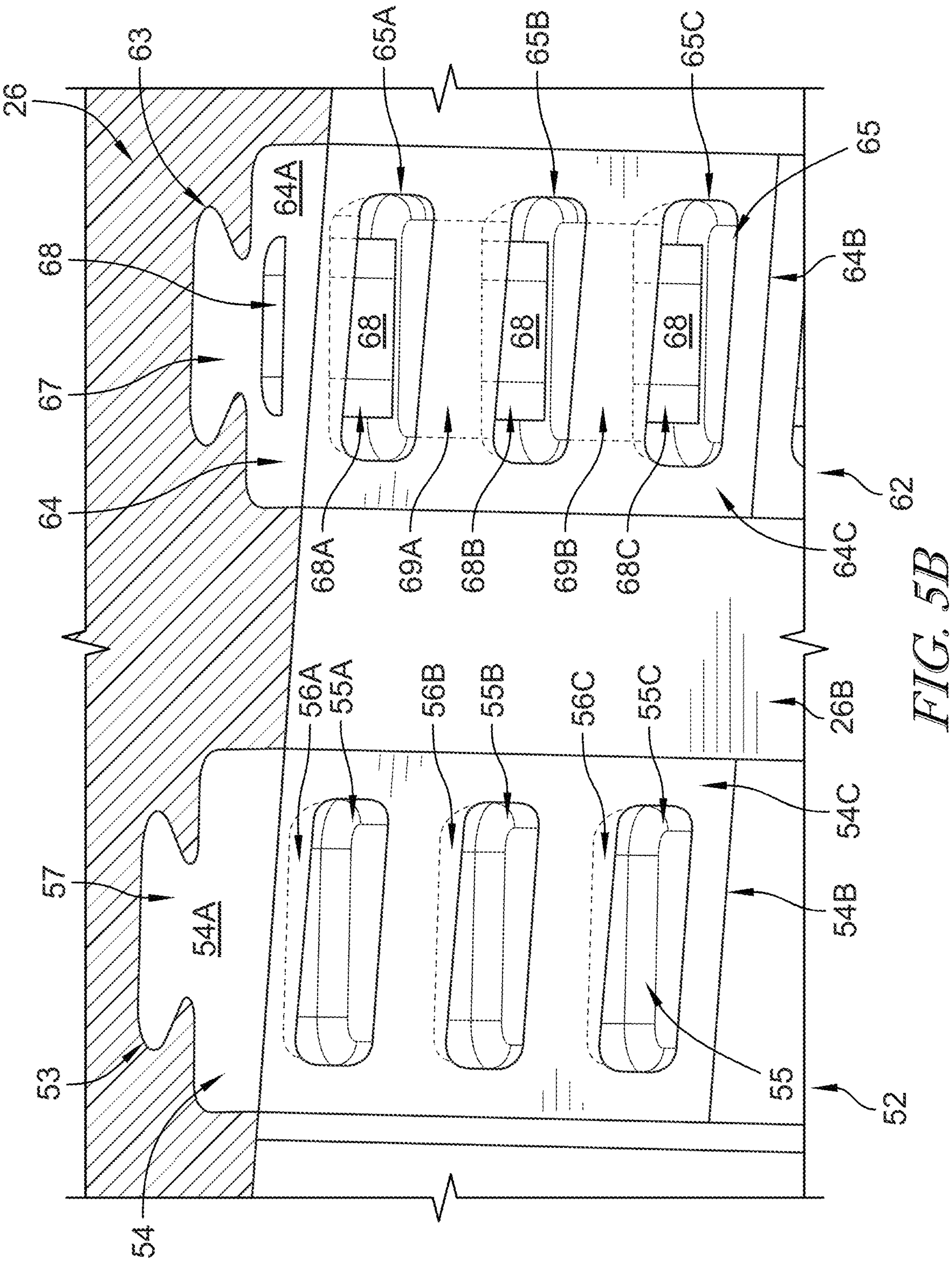
FIG. 5B is a magnified perspective view of two exemplary tip treatment segments of the tip treatment segments of FIG. 4, showing that one of the exemplary tip treatment segments can include three axially-extending parallel grooves and one of the exemplary tip treatment segments can include three axially-extending parallel grooves having a common central plenum fluidically connected to the three grooves and extending therebetween.
Figure 5C:
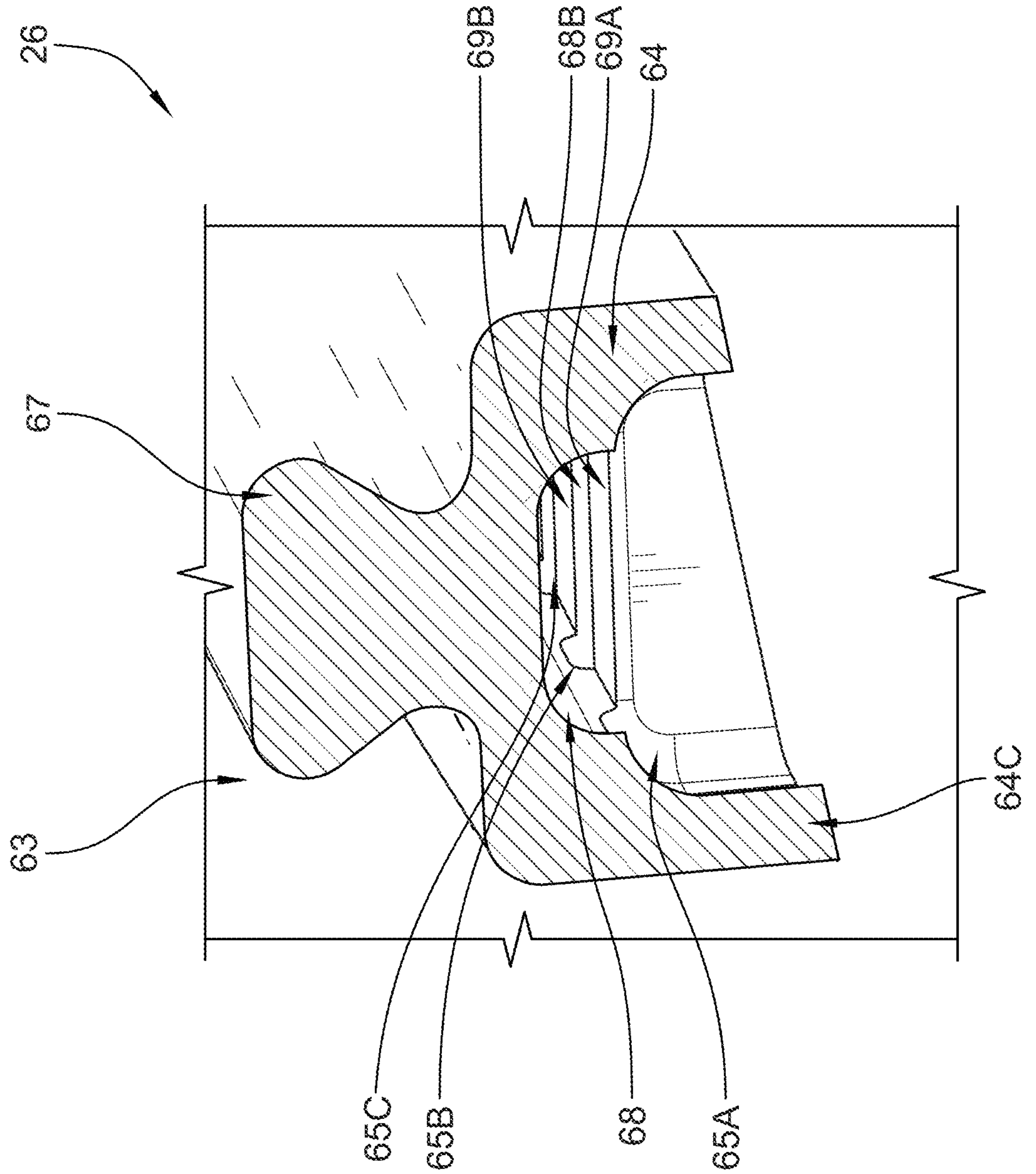
FIG. 5C is a side perspective view of the exemplary tip treatment segment including three axially extending parallel grooves having a common central plenum of FIG. 5B, showing additional details regarding the grooves and common central plenum.
Figure 5D:
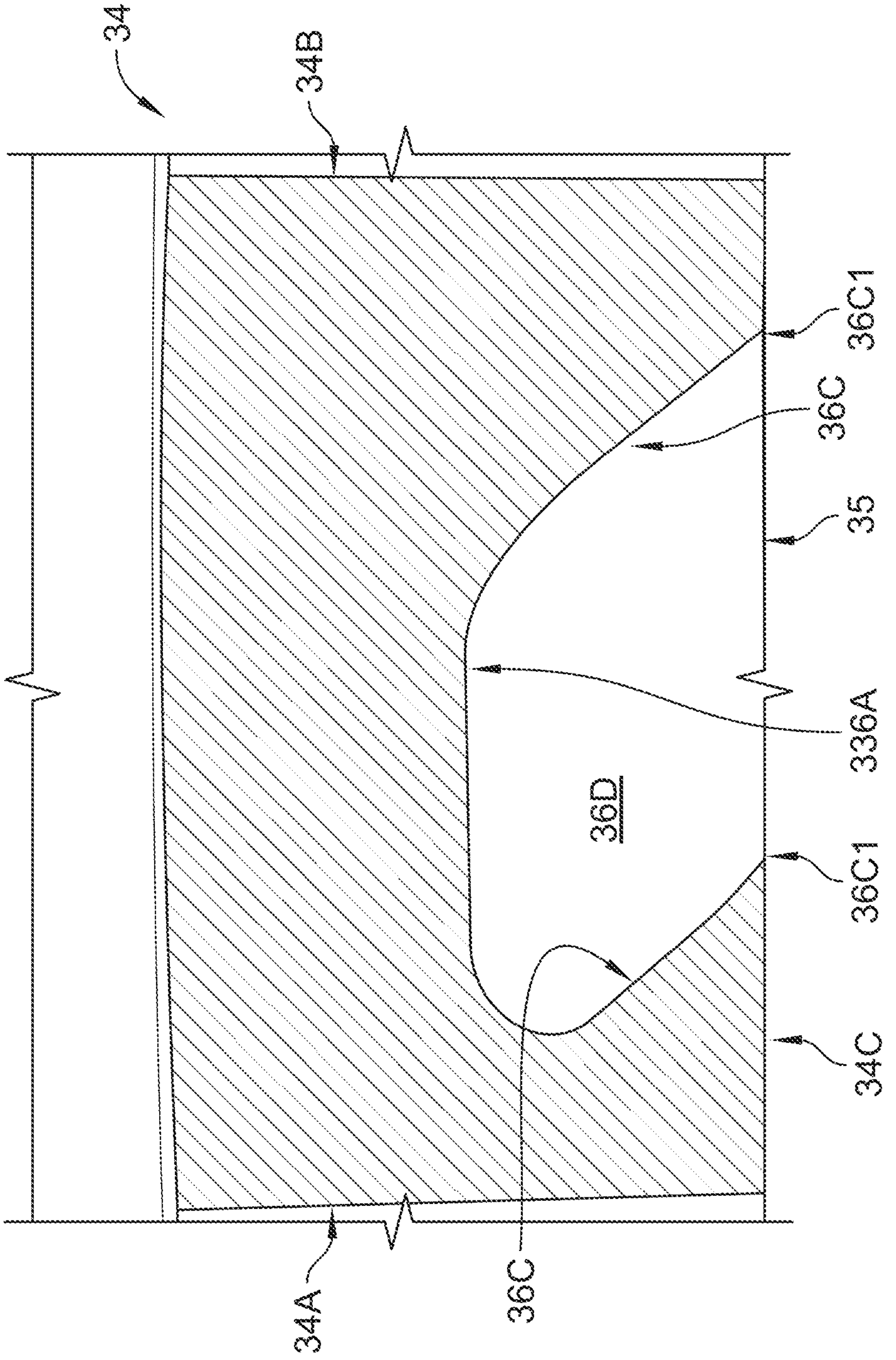
FIG. 5D is an axially forward-facing view of the exemplary tip treatment segment including the forward-leaning groove of FIG. 5A, showing that the side walls of the groove can be angled relative to the circumferentially-facing surfaces of the segment.
Figure 5E:
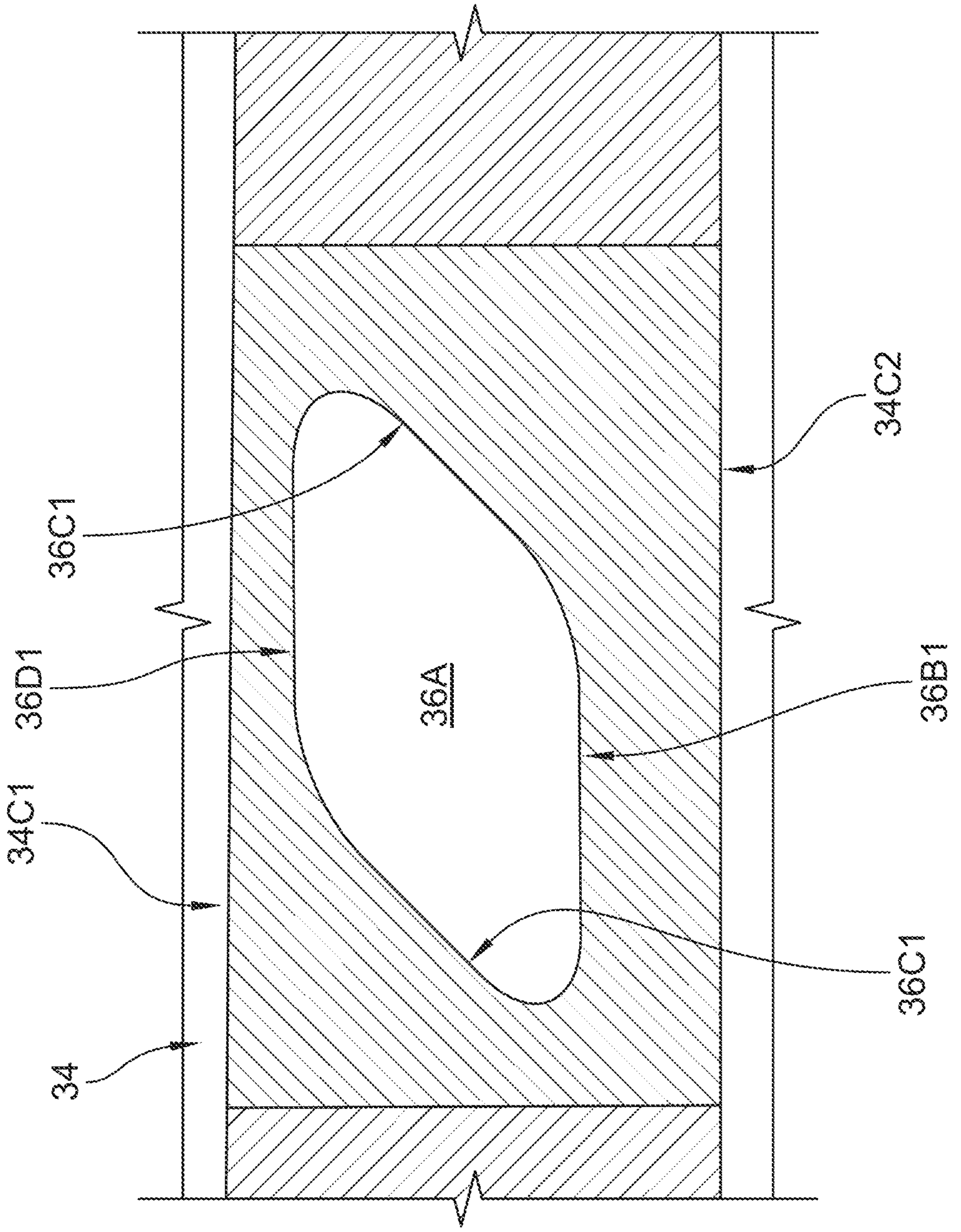
FIG. 5E is a radially-outwardly facing view of the tip treatment segment of FIG. 5D, showing the angled nature of the radially inner edges of the side walls of the groove.

In some embodiments, as shown in FIG. 5E, the radially inner edges 36C1 of the opposing circumferential inner surfaces 36C are also angled relative to the circumferential sides 34A, 34B. In some embodiments, the radially inner edges 36C1 of the two circumferential inner surfaces 36C are parallel with each other. The radially inner edge 36B1 of the aft inner surface 36B and the radially inner edge 36D1 of the forward inner surface 36D are each parallel with a corresponding forward side 34C2 and a corresponding aft side 34C1 of the segment 34, and also parallel with each other.

The forward-leaning and angled shape of groove 35 can aid in how the flow loads up and can extend stall performance, as the blade will push the air into the groove 35 and may perform better than non-slanted, non-tilted designs of similar shape. Moreover, the angle forward may better attenuate the strength of the overtip vortices or other tip effects that reduce stall margin. In some embodiments, an aft leaning groove could also be utilized.

It is noted that, in some exemplary implementations, the opening of the groove 35, defined by the edges 36B1, 36C1, 36D1, may not be the angled parallelogram shape shown in FIG. 5E, and instead may simply be a rectangular shape, as shown in FIGS. 3, 6, 7, and 9A-9D. Again, various shapes may be utilized depending on the desired flow modification through the inlet, although the effects and benefits of the parallelogram shape of FIG. 5E as described above should nevertheless be appreciated.

Figure 5G:
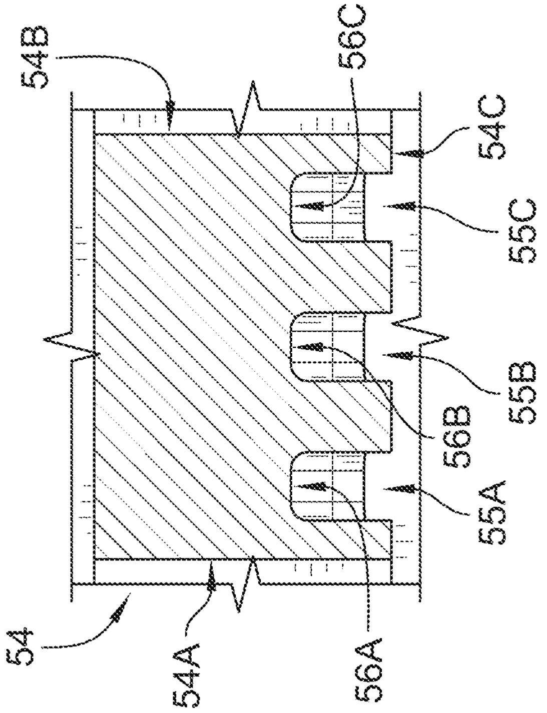
FIG. 5G is an axially forward-facing view of the exemplary tip treatment segment including the three axially-extending parallel grooves of FIG. 5B.
Figure 5F:
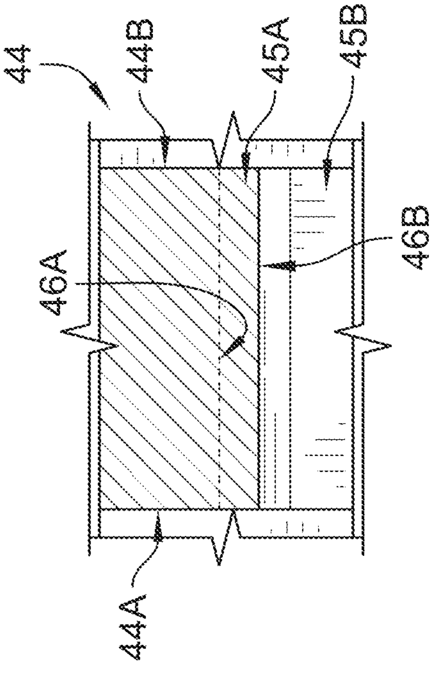
FIG. 5F is an axially forward-facing view of the exemplary tip treatment segment including the two parallel circumferentially extending grooves of FIG. 5A.

As shown in FIGS. 4, 5A, and 5F, a second treatment segment 44 is arranged in the second slot 42 axially aft of the first slot 32 and includes a first circumferential side 44A, a second opposing circumferential side 44B, and a dovetail shape protrusion 47 or segment retaining feature 47. The segment 44 may include a tip treatment feature 45 formed as two parallel grooves 45A, 45B in the radially-inwardly facing surface 44C. Specifically, an axially forward first groove 45A is formed to include a forward inner surface 45C1, an aft inner surface 45D1, and a bottom inner surface 46A that is curved. An axially aft second groove 45B is formed to include a forward inner surface 45D2, an aft inner surface 45E1, and a bottom inner surface 46B that is curved. In this way, the grooves 45A, 45B define a forward flange 45C, a central flange 45D, and an aft flange 45E.

Figure 6:
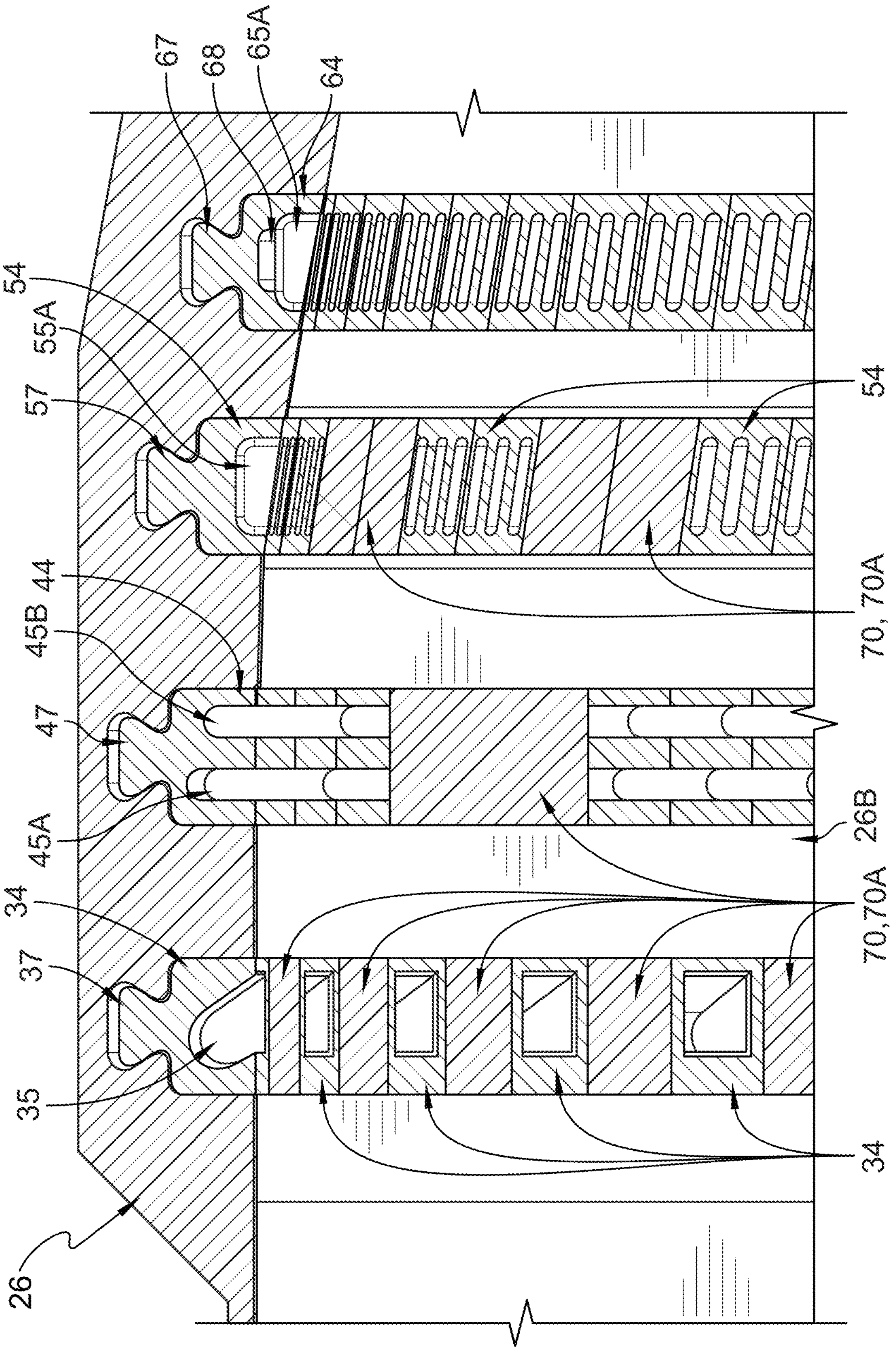
FIG. 6 is a side cross-sectional view of the fan case assembly of FIG. 3, showing the plurality of circumferentially extending slots and the plurality of tip treatment segments arranged in each slot with smooth wall segments arranged between some of the tip treatment segments.

As can be seen in FIGS. 5A and 5F, each groove 45A, 45B extends across the entire circumferential extent of the segment 44, in particular between the first and second circumferential sides 44A, 44B and opening circumferentially outwardly at each side 44A, 44B. In this way, the grooves 45A, 45B can fluidically connect to grooves 45A, 45B formed in adjacently arranged segments 44, as can be seen in FIGS. 3, 6, and 7, thus allowing for more extended treatment. Specifically, this can provide additional flow volume away from a region that is starting to locally stall which can help increase margin. Shallower versus deeper grooves 45A, 45B can provide different flow volumes over the blade tip. In some examples, a shallower groove 45A, 45B may be effective at lower fan speeds or depending on if the groove 45A, 45B is located in the passage throat or forward or aft relative to a shock location (which shifts with speed and also changes pressure distribution in the passage).

In some embodiments, the first groove 45A can be formed to be radially deeper than the second groove 45B (i.e. the bottom inner surface 46A of the first groove 45A is further radially outward than the bottom inner surface 46B of the second groove 45B). This may allow for different axial locations to effect treatment in different ways, as required.

As shown in FIGS. 4, 5B, and 5G, a third treatment segment 54 is arranged in the third slot 52 axially aft of the second slot 42 and includes a first circumferential side 54A, a second opposing circumferential side 54B, and a dovetail shape protrusion 57 or segment retaining feature 57. The segment 54 may include a tip treatment feature 55 formed as three parallel, axially extending grooves 55A, 55B, 55C in the radially-inwardly facing surface 54C. The three parallel, axially extending grooves 55A, 55B, 55C can be formed centrally along the axial and circumferential extent of the segment 54 in some embodiments, and can be formed to be equidistant from each other.

Each groove 55A, 55B, 55C includes a bottom inner surface 56A, 56B, 56C, and in some embodiments, as shown in FIG. 5G, each bottom inner surface 56A, 56B, 56C is formed at an equal radial distance from the axis 11 (i.e. each groove 55A, 55B, 55C has the same radial depth). In other embodiments, the depths of the grooves 55A, 55B, 55C may vary. In embodiments in which the radially-inwardly facing surface 54C of the segment 54 is sloped to match the slope of the adjacent portions of the radially-inwardly facing surface 26B of the annular case 26, the bottom inner surface 56A, 56B, 56C may extend parallel to the axis 11, as can be seen in FIGS. 2 and 4.

As shown in FIGS. 4, 5B, 5C, and 5H, a fourth treatment segment 64 is arranged in the fourth slot 62 axially aft of the third slot 52 and includes a first circumferential side 64A, a second opposing circumferential side 64B, and a dovetail shape protrusion 67 or segment retaining feature 67. The segment 64 may include a tip treatment feature 65 formed as three parallel, axially extending grooves 65A, 65B, 65C in the radially-inwardly facing surface 64C. The three parallel, axially extending grooves 65A, 65B, 65C can be formed centrally along the axial and circumferential extent of the segment 64 in some embodiments, and can be formed to be equidistant from each other.

Figure 5H:
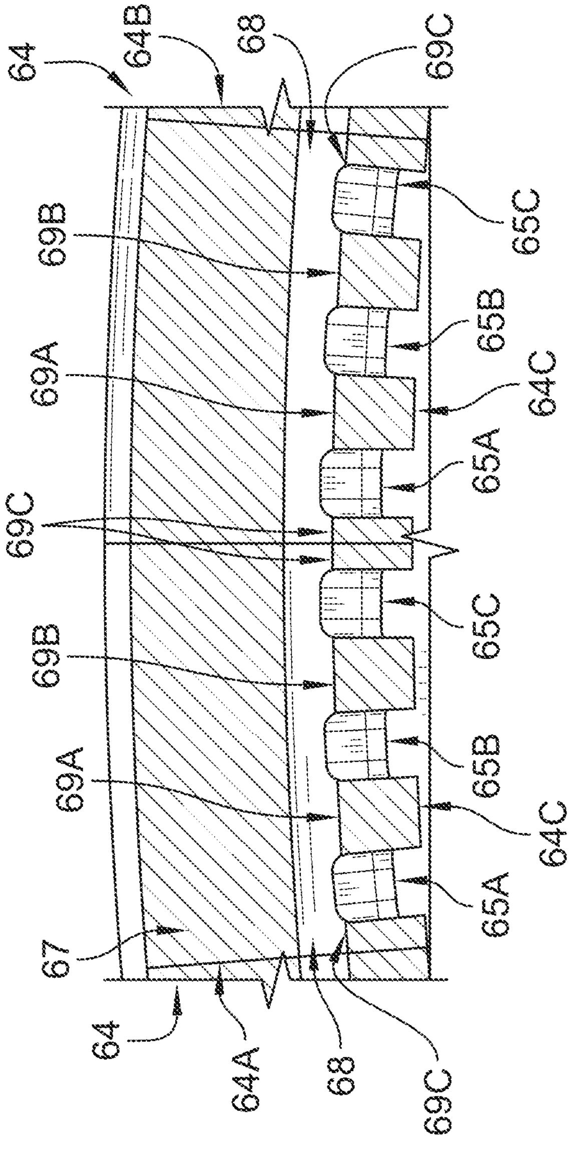
FIG. 5H is an axially forward-facing view of the exemplary tip treatment segment including the three axially-extending parallel grooves having the common central plenum of FIG. 5B.

Unlike the tip treatment segment 54 described with reference to FIG. 5G, the grooves 65A, 65B, 65C each include an opening 68A, 68B, 68C instead of the bottom inner surfaces 56A, 56B, 56C of the grooves 55A, 55B, 55C of the segment 54, as shown in detail in FIGS. 5B, 5C, and 5H. Each opening 68A, 68B, 68C opens into and is fluidically connected with a common central plenum 68 that is formed radially outward for the grooves 65A, 65B, 65C. The central plenum 68 extends across the entire circumferential extent of the segment 64, in particular between the first and second circumferential sides 64A, 64B and opening circumferentially outwardly at each side 64A, 64B. In this way, the central plenum 68 can fluidically connect to central plenums 68 formed in adjacently arranged segments 64, as can be seen in FIGS. 3, 6, and 7. This can aid in transferring flows around the circumference of the annular case 26 via multiple central plenums 68 connected in succession via adjacently arranged segments 64, thus balancing stall margin around the circumference of the case 26.

It is noted that the four different exemplary styles of tip treatment segments 34, 44, 54, 64 can be utilized in any combination of the four slots 32, 42, 52, 62. In some embodiments, the first and second tip treatment segments 34, 44 are configured to be interchanged between the first and second slots 32, 42, and the third and fourth tip treatment segments 54, 64 are configured to be interchanged between the third and fourth slots 52, 62. In other embodiments, the tip treatment segments 34, 44, 54, 64 can be interchangeable between any of the four slots 32, 42, 52, 62.

It is also noted that, although the circumferential sides of each segment 34, 44, 54, 64 and the axially forward and aft sides of each segment 34, 44, 54, 64 are shown to be extending entirely radially (i.e. orthogonally relative to the axis 11 in the radial direction), this disclosure contemplates these circumferential and axial sides extending at an angle relative to the axis 11. It is further noted that, in some embodiments, the radially inwardly-facing surface 34C, 44C, 55C, 65C of each segment 34, 44, 54, 64 can be coated with a rub-compliant layer so that if the fan blade 20 tips contacted the radially inwardly-facing surfaces 34C, 44C, 55C, 65C, fan blade 20 tips would not be damaged. This coating can apply to any embodiment described herein. In some embodiments, such as the fan case assembly 124 described below, if a significant portion of the case 26 or liner 326L experiences wear on the coating, the segments 134, 154 can be replaced as opposed to replacing the entire coating.

As shown in FIGS. 3-7, the tip treatment segments 34, 44, 54, 64 can be arranged in a variety of configurations throughout the circumference of the annular case 26. The configuration of segments 34, 44, 54, 64 could alternate around the circumference of the case 26 to explore patterns and spacings, such as alternating between treated and smooth wall (i.e. smooth wall segments 70) or the like. This may be valuable to finding the minimum treated span needed to avoid stall for example. This may also enable definition of treatment in composite for example without unnecessary features being added for longer than required duration. Alternatively or in addition, it may prove out safety factors for treatments being filled with water or oil, and how drainage or other factors can be planned around. As a non-limiting example, if a treatment should be 360 degrees around the case 26 at all times, that may not be very robust, as well as being expensive and time-consuming to produce and maintain, so being able to explore effects of quality limitations, interrupting features for manufacturability, and in-service contamination would be beneficial (and it would not be cost effective to make a new entire liner for each variation in this regard).

In some embodiments, although only shown as extending partway around the circumference of the annular case 26, one or more slots may include the same tip treatment segment arranged about the entire circumference of the case 26. This can include, for example, the fourth slot 62 which includes a plurality of fourth tip treatment segments 64 each arranged adjacent to and contacting each other at their circumferential sides 64A, 64B. Although FIGS. 3 and 7 only show these segments 64 arranged partially around the circumference of the case 26, it is contemplated that this pattern can extend around the entire circumference.

In some embodiments, although only shown as extending partway around the circumference of the annular case 26, one or more slots may include the same repeating pattern of tip treatment segments arranged about the entire circumference of the case 26. This can include, for example, the first, second, and third slots 32, 42, 52, which each include patterns of the first, second, and third tip treatment segments 34, 44, 54 around the circumference of the case 26, respectively. Although FIGS. 3 and 7 only show these patterns of segments 34, 44, 54 arranged partially around the circumference of the case 26, it is contemplated that these patterns can extend around the entire circumference.

By way of non-limiting examples, the pattern of first segments 34 arranged in the first slot 32 can be an alternating pattern of first segment 34 arranged adjacent to a smooth wall segment 70, as shown in FIGS. 3 and 7. The smooth wall segment 70 can be arranged within any of the slots 32, 42, 52, 62 and may be formed to have the same or different circumferential extents as the tip treatment segments 34, 44, 54, 64. A radially inwardly-facing surface 70A of each smooth wall segment 70 can be formed to be flush with the adjacent segments 34, 44, 54, 64 arranged in the same slot 32, 42, 52, 62, and may also be flush with the adjacent portions of the radially inwardly-facing surface 26B of the annular case 26 so as to maintain the smooth nature of the flow path 15 across these surfaces.

In some embodiments, the pattern of second segments 44 arranged in the second slot 44 can be an alternating pattern of a group of four second segments 44 and a group of three smooth wall segments 70. In some embodiments, the pattern of third segments 54 arranged in the third slot 54 can be an alternating pattern of a group of two third segments 54 and a group of two smooth wall segments 70.

The configurations shown in FIGS. 3-7 are merely exemplary, as other combinations of segments 34, 44, 54, 64 are contemplated by the present disclosure. For example, different types of tip treatment segments 34, 44, 54, 64 may be utilized in the same slot 32, 42, 52, 62, and different types of segments 34, 44, 54, 64 may be grouped together as opposed to the same types of segments 34, 44, 54, 64 being utilized in the same groups, as shown in FIGS. 3 and 7. Additionally, more or fewer smooth wall segments 70 may be utilized between single segments 34, 44, 54, 64 or groups of segments 34, 44, 54, 64, and longer or shorter smooth wall segments 70 than those shown in FIGS. 3, 6, and 7 to adjust the spacing between segments 34, 44, 54, 64. A person skilled in the art will understand that the configurations and shapes of segments 34, 44, 54, 64 is not exhaustive, and others can be envisioned based on the design needs of the engine 10.

Although four slots 32, 42, 52, 62 with multiple tip treatment segments 34, 44, 54, 64 are shown in FIGS. 2-7, a person skilled in the art will understand that more or fewer slots 32, 42, 52, 62 with tip treatment segments 34, 44, 54, 64 can be included in the annular case 26 depending on the areas requiring flow modification by the tip treatment segments 34, 44, 54, 64. For example, including two slots 32, 42 with segments 34, 44 on the first portion 26B1 that extends generally axially and two slots 52, 62 with segments 54, 64 on the second portion 26B2 that is angled radially inward may provide advantages in evenly controlling the air flow across the radially inwardly-facing surface 26B.

Moreover, different areas around the circumference of the annular case 26 may include more or fewer than four slots 32, 42, 52, 62 with tip treatment segments 34, 44, 54, 64, or may include differently sized slots 32, 42, 52, 62 and corresponding tip treatment segments 34, 44, 54, 64 (axially, radially, or circumferentially different), based on the distortions and flow behaviors experienced in those particular areas of the annular case 26. By way of a non-limiting example, different numbers of slots 32, 42, 52, 62 and different numbers and patterns of tip treatment segments 34, 44, 54, 64 can be used at different locations around the circumference of the case 26. In non-limiting examples, some regions around the circumference may experience steeper distortion challenge and thus a greater number of treatment segments 34, 44, 54, 64 may be used in such an area.

Another embodiment of a fan case assembly 124 that is configured to be utilized in the gas turbine engine 10 is shown in FIGS. 8-9D. The fan case assembly 124 is similar to the fan case assembly 24 described herein. Accordingly, similar reference numbers in the 100 series indicate features that are common between the fan case assembly 124 and the fan case assembly 24. The description of the fan case assembly 24 is incorporated by reference to apply to the fan case assembly 124, except in instances when it conflicts with the specific description and the drawings of the fan case assembly 124.

The fan case assembly 124 differs from the fan case assembly 24 described above in that the fan case assembly 124 includes tip treatment segments 134, 154 that are formed to be much larger, both axially and circumferentially, than the segments 34, 44, 54, 64 described above. As can be seen in FIG. 8, for example, a single tip segment 134, 154 can extend across the axially extent taken up by two slots 32, 42, 52, 62 and segments 34, 44, 54, 64 described above and shown in FIGS. 2-7. For example, a first tip segment 134 can occupy a majority of the axially extending first portion 126B1 of the radially inwardly-facing surface 126B of the case 126, and the second tip segment 154 can occupy a majority of or an entirety of the angled second portion 126B2 of the radially inwardly-facing surface 126B.

As can be seen in FIGS. 8-9D, each segment 134, 154 can include two circumferentially extending segment retaining features 137A, 137B, 157A, 157B which may be formed similarly to the segment retaining features 37, 47, 57, 67 described above (e.g. as dovetails). The segment retaining features 137A, 137B, 157A, 157B may be arranged in and retained by corresponding slot retaining features 133A, 133B, 153A, 153B formed in inner surfaces of the slots 132, 152, which may be formed similarly to the slot retaining features 33, 43, 53, 63 described above (e.g. as dovetail slots). Moreover, each tip treatment segment 134, 154 includes a radially-inwardly facing surface 134A, 154A that is flush with the respective portion of the radially inwardly-facing surface 126B of the case 126 within which the segment 134, 154 is arranged, in particular the first portion 126B1 and the second portion 126B2 of the radially inwardly-facing surface 126B.

FIGS. 9A-9D illustrate an advantage of utilizing the larger segments 134, 154 as opposed to the smaller individual segments 34, 44, 54, 64 described with regard to FIGS. 2-7, in particular allowing for flexibility and precision in the placement of the tip treatment features 135, 145, 155, 165. For example, the potential patterns and configurations of the smaller individual segments 34, 44, 54, 64 are limited by the sizes of the segments 34, 44, 54, 64 and the smooth wall segments 70 arranged in the slots 32, 42, 52, 62. Conversely, the tip treatment features 135, 145, 155, 165 can be arranged anywhere on the larger segments 134, 154, thus allowing for larger and smaller spacing, both axially and circumferentially, between features 135, 145, 155, 165.

Figure 9A:
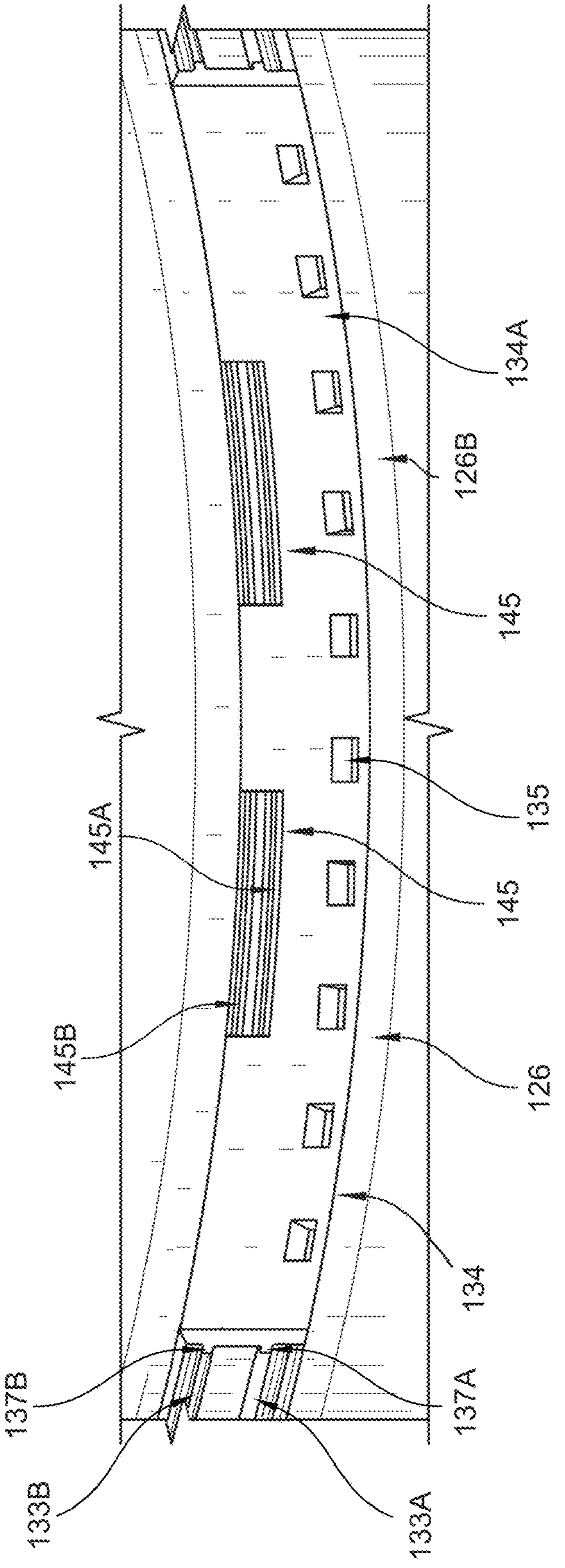
FIG. 9A is a radially outwardly-facing view of the fan case assembly of FIG. 8, showing exemplary configurations of tip treatment grooves formed in the forward tip treatment segment of FIG. 8.

A first example of an arrangement of features 135, 145, 155, 165 can be seen in FIG. 9A, which shows the forward first tip treatment segment 134 as an example. Each tip treatment segment 134, 154 can include the same tip treatment features 135, 145, 155, 165 as those tip treatment features 35, 45, 55, 65 described above, but instead formed in the same circumferentially and axially larger radially inwardly-facing surface 134A of the tip treatment segment 134, as opposed to small, individual segments, such as those segments 34, 44, 54, 64 described above. In the example shown in FIG. 9A, the tip treatment segment 134 can include multiple forward-leaning grooves 135 and multiple tip treatment features 145 (formed the same as the grooves 45A, 45B described above) arranged adjacent to each other to form parallel, circumferentially elongated grooves 145A, 145B. The second tip treatment segment 154 can include the same tip treatment features 55, 65 as described above, in particular the features 55 formed as three axially-extending grooves 55A, 55B, 55C and the features 65 formed as three axially-extending grooves 65A, 65B, 65C with a common plenum 68. Other tip treatment features could also be utilized on the tip treatment segments 134, 154 as well.

Figure 9B:
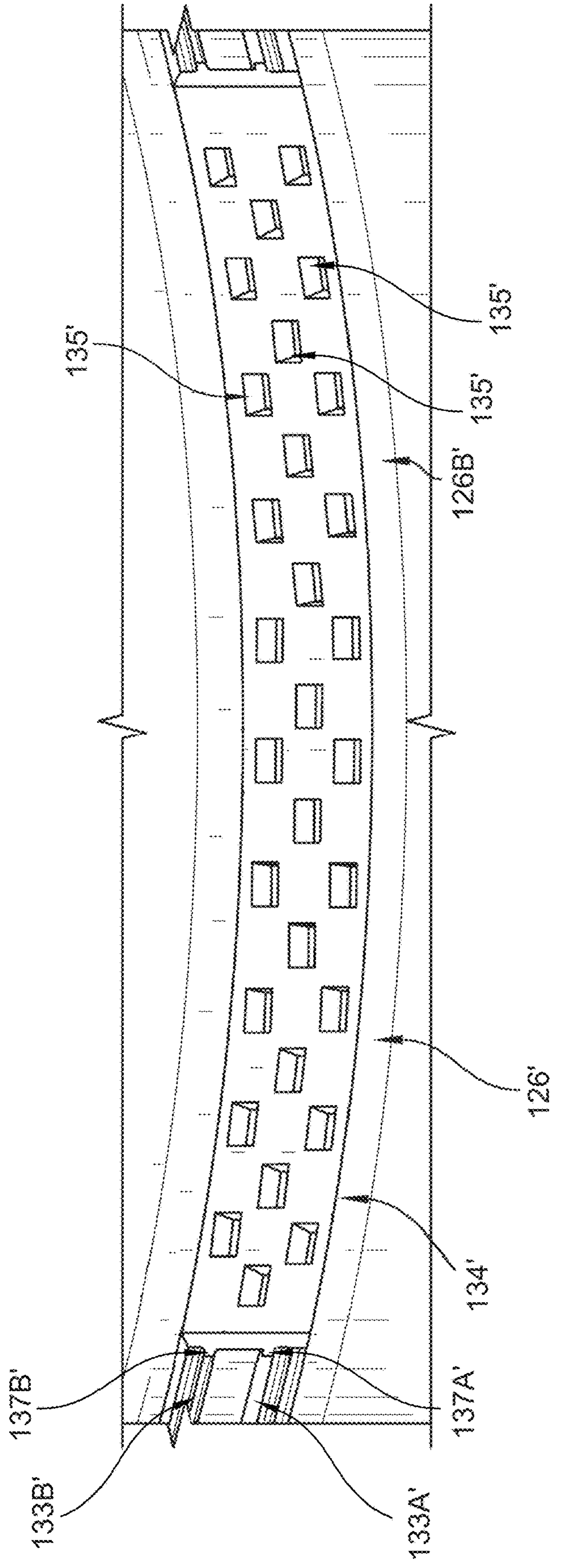
FIG. 9B is a radially outwardly-facing view of the fan case assembly of FIG. 8, showing further exemplary configurations of tip treatment grooves formed in the forward tip treatment segment of FIG. 8.
Figure 9C:
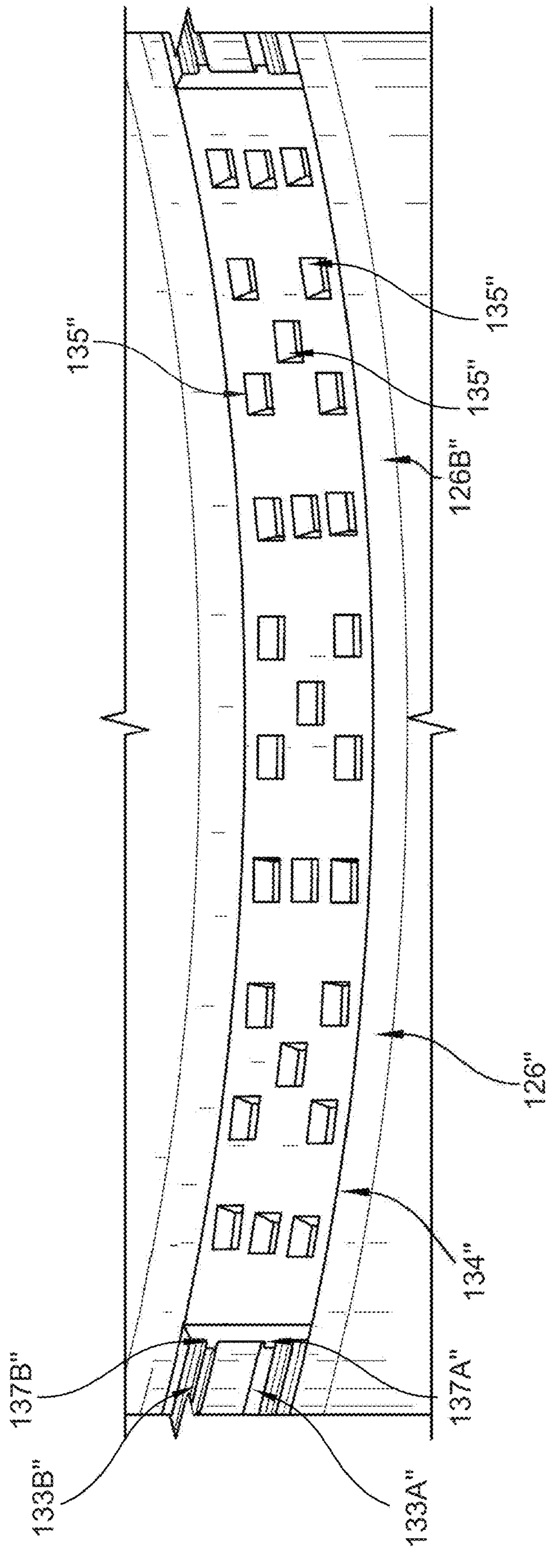
FIG. 9C is a radially outwardly-facing view of the fan case assembly of FIG. 8, showing further exemplary configurations of tip treatment grooves formed in the forward tip treatment segment of FIG. 8.
Figure 9D:
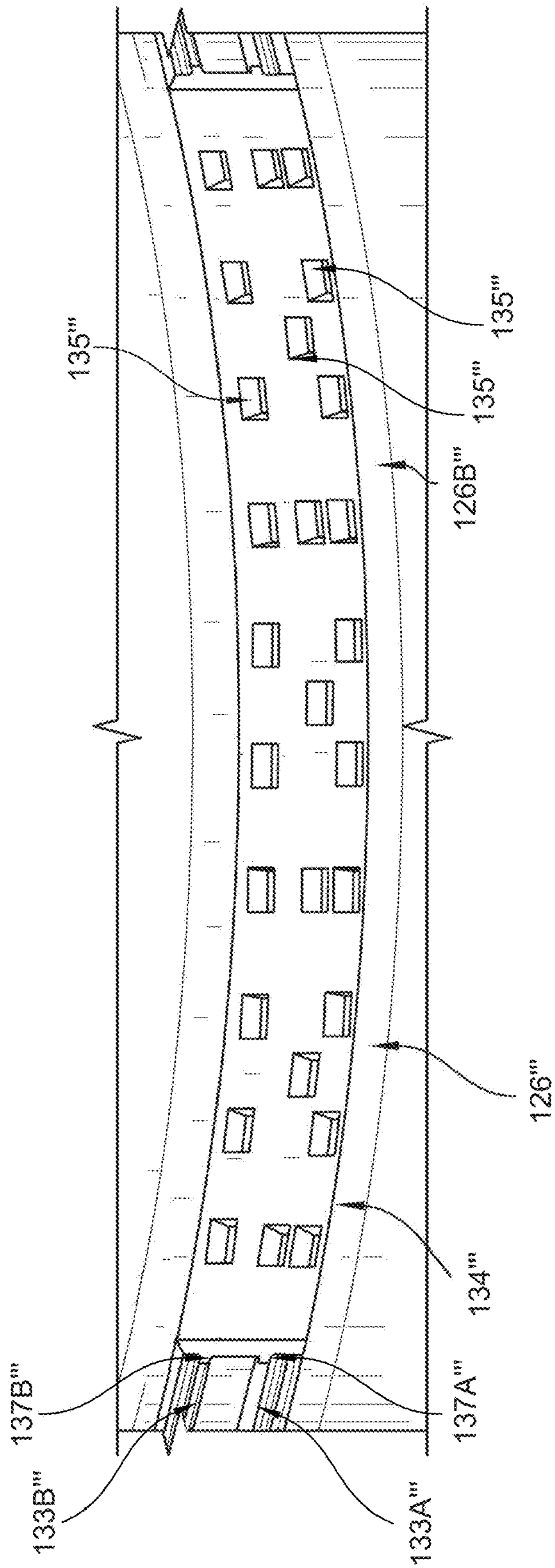
FIG. 9D is a radially outwardly-facing view of the fan case assembly of FIG. 8, showing further exemplary configurations of tip treatment grooves formed in the forward tip treatment segment of FIG. 8.

FIG. 9B shows an additional non-limiting example of a configuration of features 135' that could be utilized on the larger tip treatment segments 134', 154'. In this example, rows of the same tip treatment feature 135' can be arranged in successive axial rows, with the middle row being offset from the first and third rows. FIG. 9C shows an additional non-limiting example of a configuration of features 135" that could be utilized on the larger tip treatment segments 134", 154". In this example, rows of the same tip treatment feature 135" can be arranged in successive axial rows, with the tip treatment features 135" of the middle row being more spaced apart circumferentially than the features 135" of the first and third rows. FIG. 9D shows an additional non-limiting example of a configuration of features 135" that could be utilized on the larger tip treatment segments 134", 154". In this example, rows of the same tip treatment feature 135" can be arranged in successive axial rows, with the first and second rows being located closer to each other axially than the second and third rows.

Utilizing the larger tip treatment segments 134, 154 shown in FIGS. 8-9D may also simplify the production process, as a much smaller number of segments 134, 154 would need to be produced in order to occupy the circumferential extent of the annular case 26, as opposed to the large number of small segments 34, 44, 54, 64 that would be required to occupy the entire circumference. It may be advantageous to utilize these larger tip treatment segments 134, 154 after testing of the distortions, stall margin, and air manipulation using the small segments 34, 44, 54, 64 has already been conducted. In this way, the larger tip treatment segments 134, 154 can be produced with the confidence of knowing exactly where the tip treatment features 135, 145, 155, 165 should be located. Also, as touched on above, small segments 34, 44, 54, 64 may explore circumferential extent more flexibly while larger and longer segments 134, 154 allow for more precise exploration of location (in increments more precise than axial positionings of the smaller segments 34, 44, 54, 64 would allow).

Another embodiment of a fan case assembly 224 that is configured to be utilized in the gas turbine engine 10 is shown in FIGS. 10 and 11. The fan case assembly 224 is similar to the fan case assemblies 24, 124 described herein. Accordingly, similar reference numbers in the 200 series indicate features that are common between the fan case assembly 224 and the fan case assemblies 24, 124. The description of the fan case assemblies 24, 124 is incorporated by reference to apply to the fan case assembly 224, except in instances when it conflicts with the specific description and the drawings of the fan case assembly 224.

The fan case assembly 224 differs from the fan case assemblies 24, 124 described above in that the fan case assembly 224 includes a tip treatment segments 234 that is not retained within the annular case 226 by retaining features that include protrusions and overhangs (such as the dovetail shape of the features 37, 137 above) such that a retaining feature of the segment 234 rests on a retaining feature formed in the slot 232 so as to retain the slot 232. Instead, the tip treatment segment 234 is retained in the slot 232 via an radial retention assembly 250 arranged axially aft of the slot 232 and segment 234.

The radial retention assembly 250 can include a retaining block 258 and a retaining bolt 254 extending through a cylindrical opening 226C formed through the annular case 226, as shown in FIG. 11. The annular case 226 may include an additional recess or slot 226D formed in the radially inwardly-facing surface 226B that receives the retaining block 258. The retaining block 258 can be coupled to the retaining bolt 254 by the retaining bolt 254 extending into an opening 259 formed in the upper surface of the retaining block 258. The opening 259 can include threads to engage corresponding threads on the retaining bolt 254, although other fastening means are contemplated by the present disclosure. The retaining bolt 254 can include a bolt head 255 that extends outwardly and supports the bolt 254 within the cylindrical opening 226C so as to support the retaining block 258. In some embodiments, the bolt head 255 may rest on a washer 255A arranged on a radially outwardly-facing surface 226E of the annular case 226.

In some embodiments, the components of the radial retention assembly 250 may be formed via 3D printing or additive manufacturing. In some examples, the components of the radial retention assembly 250 may be comprised of 7050 or 6061 aluminum or Ti 6-4 powder.

Illustratively, the retaining block 258 includes an axially-extending flange 260 that extends toward the tip treatment segment 234, as shown in FIG. 11. The tip treatment segment 234 can be formed similar to the tip treatment segments 34, 44, 54, 64, 134, 154 described herein, in particular to include tip treatment features. The tip treatment segment 234 can include a locating protrusion 235 that extending radially outward into a corresponding locating recess 233 formed in the slot 232. The tip treatment segment 234 further includes an axially-extending protrusion 236 formed in an axially facing surface of the segment 234. The flange 260 of the retaining block 258 extends under the axially-extending protrusion 236 such that the flange 260 supports the tip treatment segment 234 in the slot 232. In some embodiments, the retaining block 258 has the same circumferential extent as the tip treatment segment 234, although the size of each may differ in some embodiments.

In some embodiments, the annular case 226 may further include a lip 226L formed in a forward wall of the slot 232 that extends axially aft. The tip treatment segment 234 can further include a corresponding lip-receiving recess 234L formed in a forward surface of the segment 234 that receives the lip 226L. The lip 226L serves to retain a forward portion of the segment 234, while the retaining block 258 serves to retain an aft portion of the segment 234.

This configuration may be useful in arrangements in which the tip treatment segments 234 must be inserted radially into the slots 232 as opposed to inserted at circumferential openings of the slots, as is the case with the segments 34, 44, 54, 64, 134, 154 described above. As such, the annular case 226 can be formed as a full annular hoop as opposed to in segments, and the tip treatment segments 234 can be inserted radially into the slots 232 around the circumference of the annular case 226.

Another embodiment of a fan case assembly 324 that is configured to be utilized in the gas turbine engine 10 is shown in FIG. 12. The fan case assembly 324 is similar to the fan case assemblies 24, 124, 224 described herein. Accordingly, similar reference numbers in the 300 series indicate features that are common between the fan case assembly 324 and the fan case assemblies 24, 124, 224. The description of the fan case assemblies 24, 124, 224 is incorporated by reference to apply to the fan case assembly 324, except in instances when it conflicts with the specific description and the drawings of the fan case assembly 324.

The fan case assembly 324 is essentially the same as the fan case assembly 24 described above, but instead of the slots being formed in the annular case 326, the slots 332, 342, 352, 362 are formed in a fan track liner 326L that is coupled to the annular case 326 radially inward of the case 326 via fasteners 326F. The description of the annular case 26, the slots 32, 42, 52, 62, and the tip treatment segments 34, 44, 54, 64 apply to and are incorporated in the fan track liner 326L (i.e. the same slots and tip treatment segments are formed in and arranged in the fan track liner 326L). Integrating the slots 32, 42, 52, 62 with a separate liner 326L can also provide the opportunity for material differences between the case 326 and the liner 326L so weight can be optimized, such as, for example, a metallic case 326 with a composite liner 326L.

FIG. 12 also shows alternative options for the tip treatment features formed in the tip treatment segments 334, 344, 354, 364. For example, the tip treatment features can be formed as protrusions 355, 365 that extend radially inwardly away from the radially inwardly-facing surfaces of the tip treatment segments 334, 344, 354, 364. The protrusion 355, 365 alter the flow of air over the surfaces differently than the groove-style features 35, 45, 55, 65 described above, and provide alternative effects that can be desirable in certain scenarios.

A method according to the present disclosure includes providing an annular case 26 that extends at least partway circumferentially around an axis 11 of a gas turbine engine 10, the annular case 26 including a radially outwardly-facing surface 26E and a radially inwardly-facing surface 26B opposite the radially outwardly-facing surface 26E. The method can further include forming a first slot 32, 42, 52, 62 in the radially inwardly-facing surface 26B of the annular case 26, the first slot 32, 42, 52, 62 extending circumferentially at least partway around the axis 11.

The method can further include forming at least one tip treatment groove 35, 45, 55, 65 in a radially inwardly-facing segment surface 34C, 44C, 54C, 64C of the at least one tip treatment segment 34, 44, 54, 64, the radially inwardly-facing segment surface 34C, 44C, 54C, 64C defining a portion of a flow path 15 across the annular case 26, the at least one tip treatment segment 34, 44, 54, 64 being selectively removable from and insertable into the first slot 32, 42, 52, 62 and is slidable within and along the first slot 32, 42, 52, 62.

The method can further include arranging the at least one tip treatment segment 34, 44, 54, 64 within the first slot 32, 42, 52, 62 and retaining the at least one tip treatment segment 34, 44, 54, 64 therein, and selectively positioning the at least one tip treatment segment 34, 44, 54, 64 within the first slot 32, 42, 52, 62 so as to alter the portion of the flow path across the annular case 26 in order to control stall margin of the gas turbine engine 10 and optimize performance of the gas turbine engine 10.

The present disclosure provides numerous advantages in controlling stall margin and optimizing engine 10 performance. When dealing with inlet distortion from an embedded installation or boundary layer ingestion (BLI), there may be need for additional stall margin or mitigation of aeromechanical challenges. Analysis of behavior of flow based on the effects of features around the annular case relative to the fan blade tips (i.e. tip treatment) may be computationally intensive and constructing variation for testing may be expensive and time consuming. Changing treatment designs on an aircraft is not conventionally very feasible or limited and time consuming.

The fan case assemblies 24, 124, 224, 324 described herein improve control over stall margin and air flow manipulation, as well as determination and analysis of these effects, so as to optimize engine 10 performance. This is done via incorporating the fan case assemblies 24, 124, 224, 324 described above, in particular the various slot and tip treatment segment configurations, which allow small portions of tip treatment to be attached to the annular case and provide a desired array of tip treatment. Advantageously, the tip treatment segments can quickly changed between different arrays, configurations, and designs. This allows for multiple treatments to be evaluated in a limited time and on-the-fly adjustments made to suit investigation, rather than having to plan and assume what configurations would be needed. The interchangeable treatment pieces can be intermixed with smooth wall blanks (i.e. smooth wall segments 70) so patterns and spacings can be evaluated, and compete different treatment styles against one another.

In some embodiments, this could be implemented in a split (i.e. segmented) annular case configuration with circumferential dove tail slots machined into the axial locations where tip treatment is desirable. It is possible for long axial treatment distances to be covered with two or more slots combined with one treatment piece to increase the axial variation possible (and could have such an arrangement at each hade angle). Alternatively, there could be axial slots in a full hoop case with an axial make-up piece installed radially ahead of it to capture and retain the segment.

The fan case assemblies 24, 124, 224, 324 described herein can provide rapid investigation of stall margin benefit without multiple alternate liners being designed and fabricated. The small treatment blocks can be cheaper to produce with challenges like distortion and allow more flexibility around test configurations. In contrast to other test setups (such as a 3D printed a plastic surround), this can be more easily made flight-worthy for development of flight testing and permit further modification of design configurations quickly as challenges or needs are discovered. Ultimately, quick-swap tip treatments could also be exchanged for different missions or aircraft usages in operation-providing increased value for flexible assets or evolving needs.

The flexibility and speed enabled by the disclosed fan case assemblies 24, 124, 224, 324 may be quite beneficial in understanding both different treatment styles for different fan rotors (interaction effects are expected) and also can allow for quick changing of stall margin for different missions, which may include splitting of the fan case and changing over of the treatment segments. This could also be done at overhaul or a base for using the same base engine for multiple applications and then tailoring setup for each mission of the aircraft using the engine.

It is also noted that, because much of the radial thickness is retained and there are no radial holes (i.e. embodiments shown in FIGS. 2-9D), the disclosed fan case assemblies may be reasonable for containment. For designs with liners (i.e. FIG. 12), there are typically assembly challenges and radial holes, while this may have sufficient compliance by the number of pieces that can be installed around the circumference.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected. Any combination of the embodiments described herein are envisioned by the present disclosure, including any combination of components and features of each embodiment that are compatible with each other may be within the spirit of the disclosure.

What is claimed is:

1. A fan case assembly adapted for use with a gas turbine engine, the fan case assembly comprising an annular case that extends at least partway circumferentially around an axis of a gas turbine engine, the annular case including a radially outwardly-facing surface and a radially inwardly-facing surface opposite the radially outwardly-facing surface, the annular case further including a first slot formed in the radially inwardly-facing surface and extending circumferentially at least partway around the axis, at least one tip treatment segment arranged within the first slot and retained therein, the at least one tip treatment segment including a radially inwardly-facing segment surface having at least one tip treatment groove formed therein, the radially inwardly-facing segment surface defining a portion of a flow path across the annular case, and at least one blank wall segment arranged within the first slot, wherein the at least one tip treatment segment is selectively removable from and insertable into the first slot and is slidable within and along the first slot such that the at least one tip treatment segment is configured to be selectively positioned within the first slot so as to alter the portion of the flow path across the annular case in order to control stall margin of the gas turbine engine and optimize performance of the gas turbine engine, wherein the first slot is defined by a forward surface and an aft surface spaced apart from the forward surface, and wherein the forward surface faces the aft surface so as to define at least a portion of the first slot therebetween, and wherein the at least one blank wall segment and the at least one tip treatment segment have an axial extent that spans an axial extent of the first slot, wherein the at least one blank wall segment and the at least one tip treatment segment are formed as single, monolithic components that are separate from each other such that each can be selectively inserted and removed from the first slot without the insertion or removal of the other, wherein the at least one blank wall segment includes no tip treatment groove, wherein the at least one tip treatment segment includes a plurality of tip treatment segments arranged within the first slot at different circumferential positions, wherein at least one of (i) the at least one blank wall segment is arranged circumferentially between and contacting two tip treatment segments of the at plurality of tip treatment segments so as to circumferentially space apart the two tip treatment segments, or (ii) the plurality of tip treatment segments includes a first group of two or more tip treatment segments and a second group of two or more tip treatment segments circumferentially spaced apart from the first group of two or more tip treatment segments, and the at least one blank wall segment is arranged circumferentially between and contacting the first and second groups of two or more tip treatment segments so as to circumferentially space apart the first and second groups of two or more tip treatment segments.

2. The fan case assembly of claim 1, wherein the at least one tip treatment segment includes a first tip treatment segment and a second tip treatment segment, and wherein the first and second tip treatment segments are arranged within the first slot at different circumferential positions.

3. The fan case assembly of claim 2, wherein a circumferentially-facing surface of the first tip treatment segment contacts a circumferentially-facing surface of the second tip treatment segment such that the first and second tip treatment segments are arranged circumferentially adjacent to each other.

4. The fan case assembly of claim 3, wherein the at least one tip treatment groove of the first tip treatment segment is identical to the at least one tip treatment groove of the second tip treatment segment.

5. The fan case assembly of claim 2, wherein the first tip treatment segment is circumferentially spaced apart from the second tip treatment segment.

6. The fan case assembly of claim 1, wherein the at least one blank wall segment includes a radially inwardly-facing blank wall surface that includes a constant, uninterrupted curvature in the circumferential direction.

7. The fan case assembly of claim 6, wherein the radially inwardly-facing blank wall surface, the radially inwardly-facing segment surfaces of the first and second tip treatment segments, and the radially inwardly-facing surface of the annular case are flush with each other so as to define a blank surface across which the flow path extends but for the at least one grooves formed in the first and second tip treatment segments.

8. The fan case assembly of claim 1, wherein the annular case further includes a second slot formed in the radially inwardly-facing surface and extending circumferentially at least partway around the axis, the second slot being axially spaced apart from the first slot, and wherein the second slot includes one or more tip treatment segments of the at least one tip treatment segment arranged therein.

9. The fan case assembly of claim 1, wherein the at least one tip treatment segment includes a protrusion and the first slot includes a recess formed in an inner surface of the first slot, and wherein the protrusion includes a portion arranged radially outwardly of and that overhangs and rests on a corresponding radially outwardly-facing portion of the recess such that the recess retains the at least one tip treatment segment within the first slot.

10. The fan case assembly of claim 9, wherein the recess of the first slot extends circumferentially along a circumferential extent of the first slot and is formed to have a dovetail shape, and wherein the protrusion of the at least one tip treatment segment extends circumferentially along a circumferential extent of the at least one tip treatment segment and includes a dovetail shape that corresponds with the dovetail shape of the recess of the first slot.

11. The fan case assembly of claim 1, wherein the annular case is segmented to define an annular case segment, wherein a plurality of annular case segments including the annular case segment are arranged circumferentially adjacent to each other so as to form a full hoop annular ring, and wherein the at least one tip treatment segment is configured to be removed from and inserted into the first slot via a circumferential opening of the first slot located at a circumferential end of the annular case segment.

12. A fan case assembly adapted for use with a gas turbine engine, the fan case assembly comprising an annular case or a fan case liner that extends at least partway circumferentially around an axis of a gas turbine engine and including a first slot formed therein and extending circumferentially at least partway around the axis and opening radially inwardly, a first tip treatment segment arranged within the first slot and retained therein, the first tip treatment segment including a radially inwardly-facing segment surface having a first tip treatment feature formed on the radially inwardly-facing segment surface, a second tip treatment segment arranged within the first slot, circumferentially spaced apart from the first tip treatment segment, and retained therein, the second tip treatment segment including a radially inwardly-facing segment surface having a second tip treatment feature formed on the radially inwardly-facing segment surface, and at least one blank wall segment arranged within the first slot circumferentially between the first and second tip treatment segments, wherein the first and second tip treatment segments are selectively removable from and insertable into the first slot at unique circumferential positions within the first slot such that the first and second tip treatment segments are configured to be selectively positioned within the first slot, wherein the at least one blank wall segment and the at least one tip treatment segment have an axial extent that spans an axial extent of the first slot, wherein the at least one blank wall segment includes no tip treatment groove, and wherein the at least one blank wall segment and the at least one tip treatment segment are formed as single, monolithic components that are separate from each other such that each can be selectively inserted and removed from the first slot without the insertion or removal of the other.

13. The fan case assembly of claim 12, wherein the first tip treatment feature formed on the radially inwardly-facing segment surface is a groove formed in the radially inwardly-facing segment surface and opening radially inwardly.

14. The fan case assembly of claim 13, wherein the second tip treatment feature formed on the radially inwardly-facing segment surface of the second tip treatment is a groove formed in the radially inwardly-facing segment surface and opening radially inwardly.

15. The fan case assembly of claim 14, wherein the annular case or fan track liner further includes a second slot formed therein and extending circumferentially at least partway around the axis and opening radially inwardly, and wherein the second slot includes a third tip treatment segment arranged therein.

16. The fan case assembly of claim 15, wherein the groove of the first tip treatment feature of the third tip treatment segment includes a different shape than the grooves of the first and second tip treatment features of the first and second tip treatment segments.

17. A method comprising providing an annular case that extends at least partway circumferentially around an axis of a gas turbine engine, the annular case including a radially outwardly-facing surface and a radially inwardly-facing surface opposite the radially outwardly-facing surface, forming a first slot in the radially inwardly-facing surface of the annular case, the first slot extending circumferentially at least partway around the axis, forming at least one tip treatment groove in a radially inwardly-facing segment surface of a first tip treatment segment, the radially inwardly-facing segment surface defining a portion of a flow path across the annular case, the first tip treatment segment being selectively removable from and insertable into the first slot and is slidable within and along the first slot, forming at least one tip treatment groove in a radially inwardly-facing segment surface of a second tip treatment segment, the radially inwardly-facing segment surface defining a portion of a flow path across the annular case, the second tip treatment segment being selectively removable from and insertable into the first slot and is slidable within and along the first slot, arranging the first tip treatment segment within the first slot and retaining the first tip treatment segment therein, arranging the second tip treatment segment within the first slot and retaining the second tip treatment segment therein, arranging at least one blank wall segment within the first slot circumferentially between the first and second tip treatment segments and retaining the at least one blank wall segment therein, selectively positioning the first and second tip treatment segments and the at least one blank wall segment within the first slot so as to alter the portion of the flow path across the annular case in order to control stall margin of the gas turbine engine and optimize performance of the gas turbine engine, wherein the first slot is defined by a forward surface and an aft surface spaced apart from the forward surface, and wherein the forward surface faces the aft surface so as to define at least a portion of the first slot therebetween, wherein the at least one blank wall segment and the at least one tip treatment segment have an axial extent that spans an axial extent of the first slot, wherein the at least one blank wall segment includes no tip treatment groove, and wherein the at least one blank wall segment and the at least one tip treatment segment are formed as single, monolithic components that are separate from each other such that each can be selectively inserted and removed from the first slot without the insertion or removal of the other.

18. The fan case assembly of claim 15, wherein the first slot is formed in a first portion of the annular case and the second is formed in a second portion of the annular case aft of the first portion, wherein a radially inwardly-facing surface of the first portion is parallel with the axis in an axial direction, and wherein a radially inwardly-facing surface of the second portion is angled relative to the axis in the axial direction.

* * * * *